United States Patent
Ishisaka

Patent Number: 5,418,647
Date of Patent: May 23, 1995

[54] COMPACT ZOOM LENS FOR USE IN A LENS SHUTTER CAMERA

[75] Inventor: Akira Ishisaka, Hino, Japan

[73] Assignee: Konica Corporation, Tokyo, Japan

[21] Appl. No.: 995,161

[22] Filed: Dec. 22, 1992

[30] Foreign Application Priority Data

Jan. 14, 1992 [JP] Japan .................. 4-023368
Jan. 14, 1992 [JP] Japan .................. 4-023369
Mar. 31, 1992 [JP] Japan .................. 4-103952

[51] Int. Cl.$^6$ .............................. G02B 15/14
[52] U.S. Cl. .................................... 359/692
[58] Field of Search ............. 359/692, 676, 683

[56] References Cited

U.S. PATENT DOCUMENTS

| | | | |
|---|---|---|---|
| 5,168,403 | 12/1992 | Umeda et al. | 359/692 |
| 5,270,867 | 12/1993 | Estelle | 359/692 |
| 5,280,390 | 1/1994 | Ito | 359/692 |

FOREIGN PATENT DOCUMENTS 56-128911 10/1981 Japan .
3-127008 5/1991 Japan .
3-200913 9/1991 Japan .

*Primary Examiner*—Scott J. Sugarman
*Attorney, Agent, or Firm*—Finnegan, Henderson, Farabow, Garrett & Dunner

[57] ABSTRACT

A compact zoom lens constituted of, from an object side, a first lens group having a positive refractive power and a second lens group having a negative refractive power, in which image magnification is varied by adjusting the distance between the two lens groups. The first lens group is composed of a front lens component having a negative refractive power including at least one aspherical surface and a rear lens component having a positive refractive power. The front lens component is composed of the first negative lens and the second meniscus lens. The convex surface of the meniscus lens is directed to the image side. The following inequality is satisfied: $\nu n < 35$ where $\nu n$ is the Abbe's number of the lens which has a stronger negative refractive power of the two lenses in the front component of the first lens group.

6 Claims, 27 Drawing Sheets

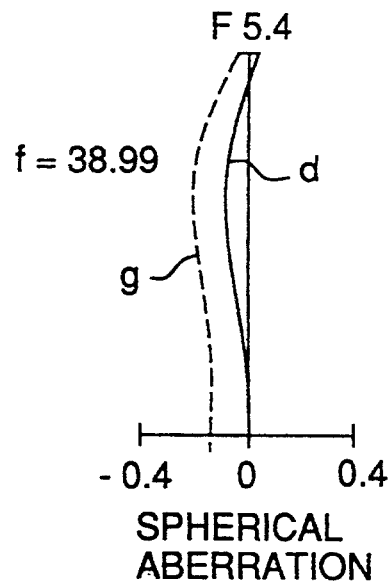
FIG. 6 (a) SPHERICAL ABERRATION
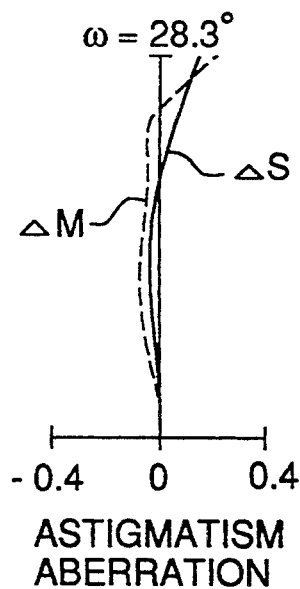
FIG. 6 (b) ASTIGMATISM ABERRATION
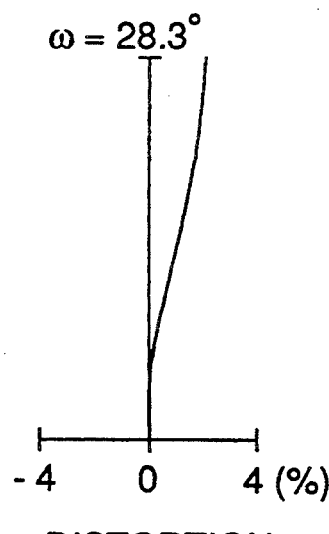
FIG. 6 (c) DISTORTION
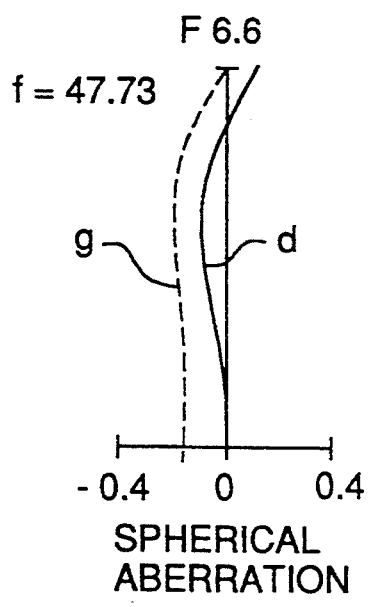
FIG. 6 (d) SPHERICAL ABERRATION
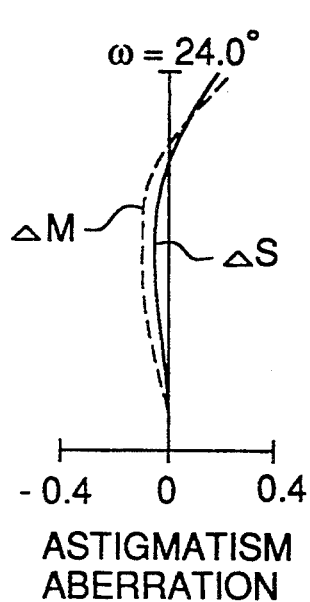
FIG. 6 (e) ASTIGMATISM ABERRATION
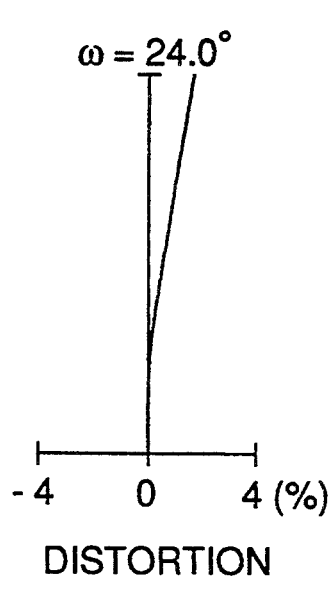
FIG. 6 (f) DISTORTION

SPHERICAL
ABERRATION

ASTIGMATISM
ABERRATION

DISTORTION

SPHERICAL
ABERRATION

ASTIGMATISM
ABERRATION

DISTORTION

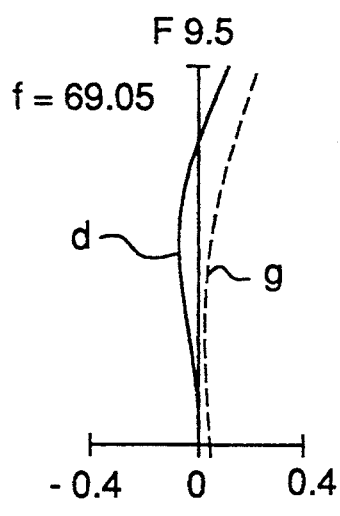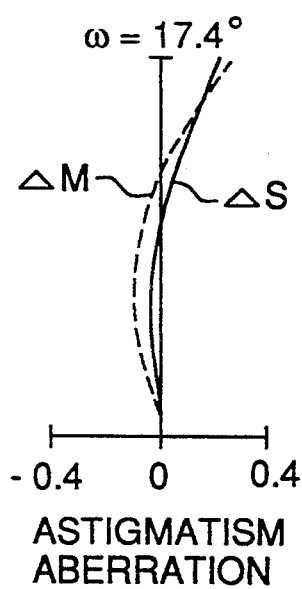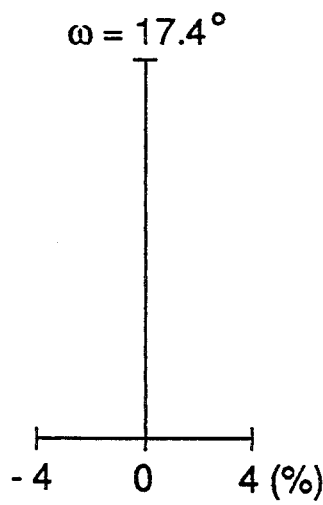
FIG. 7 (g)  FIG. 7 (h)  FIG. 7 (i)

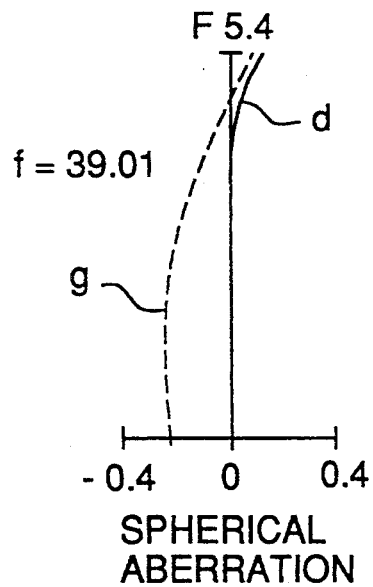
FIG. 8 (a) SPHERICAL ABERRATION
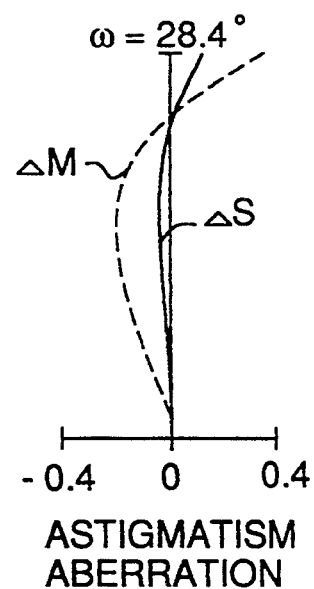
FIG. 8 (b) ASTIGMATISM ABERRATION
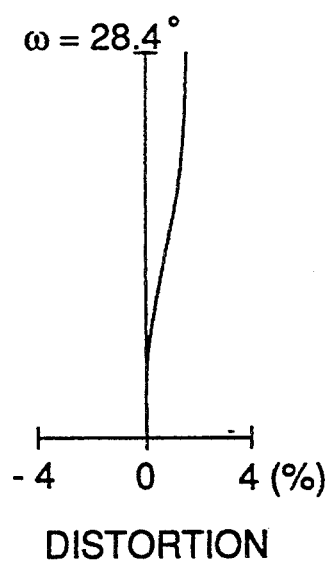
FIG. 8 (c) DISTORTION
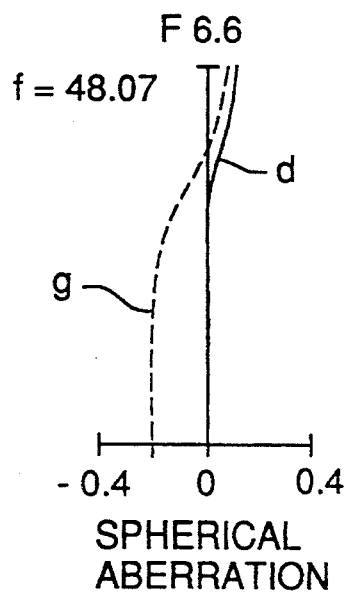
FIG. 8 (d) SPHERICAL ABERRATION
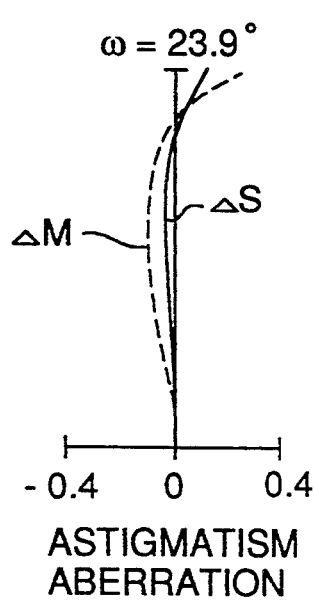
FIG. 8 (e) ASTIGMATISM ABERRATION
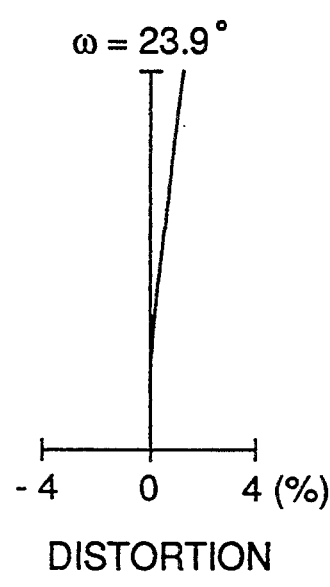
FIG. 8 (f) DISTORTION

SPHERICAL ABERRATION

ASTIGMATISM ABERRATION

DISTORTION

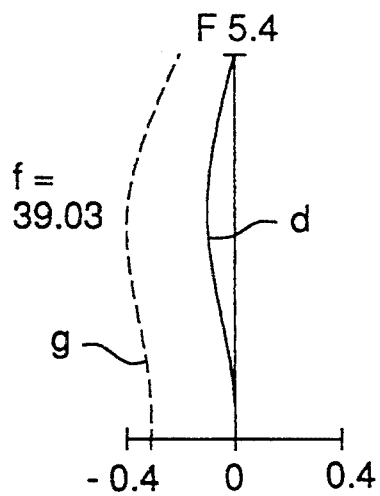
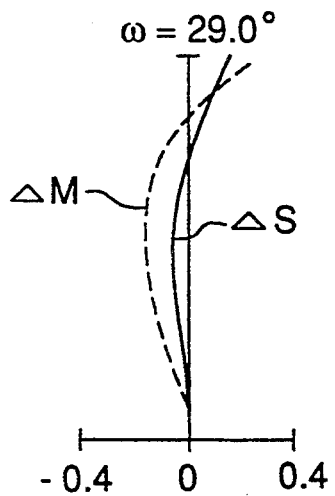
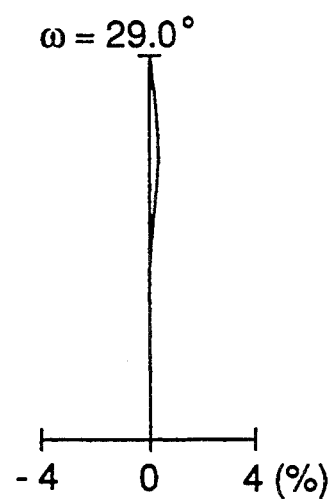
FIG. 9 (a) SPHERICAL ABERRATION    FIG. 9 (b) ASTIGMATISM ABERRATION    FIG. 9 (c) DISTORTION
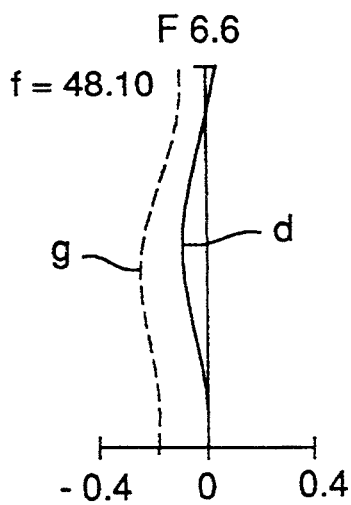
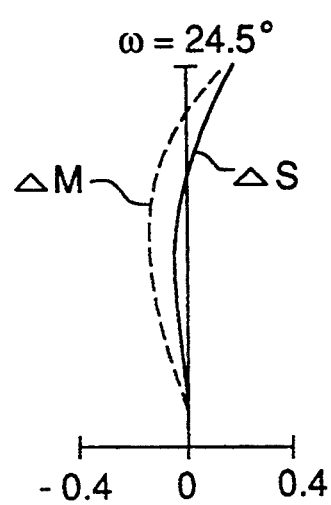
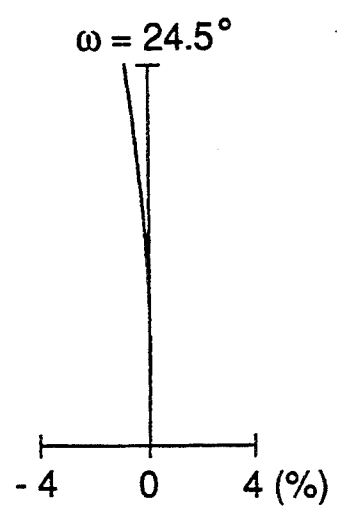
FIG. 9 (d) SPHERICAL ABERRATION    FIG. 9 (e) ASTIGMATISM ABERRATION    FIG. 9 (f) DISTORTION

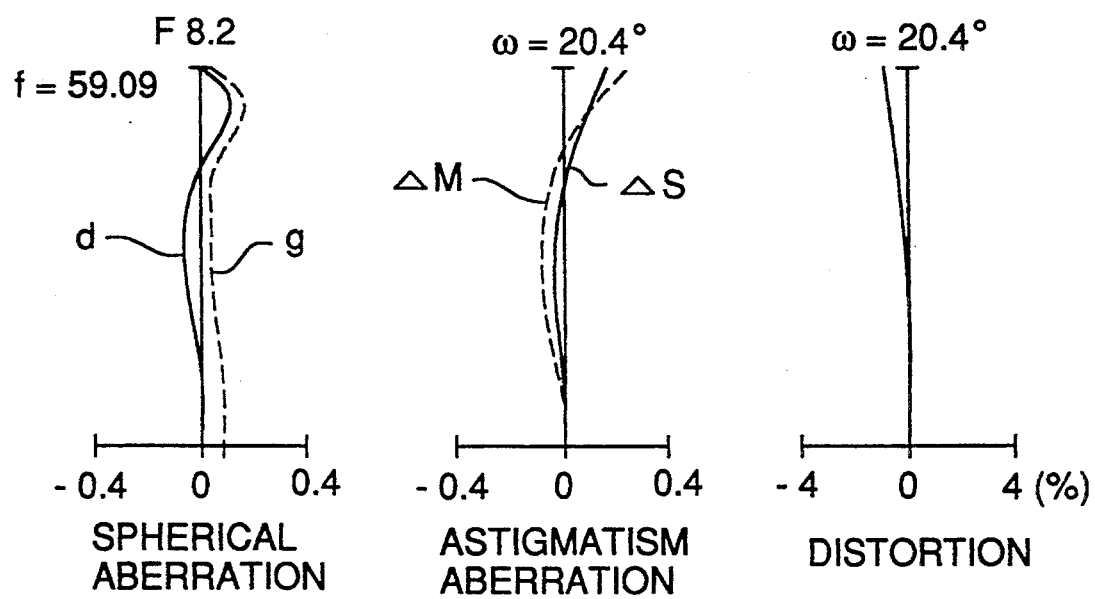

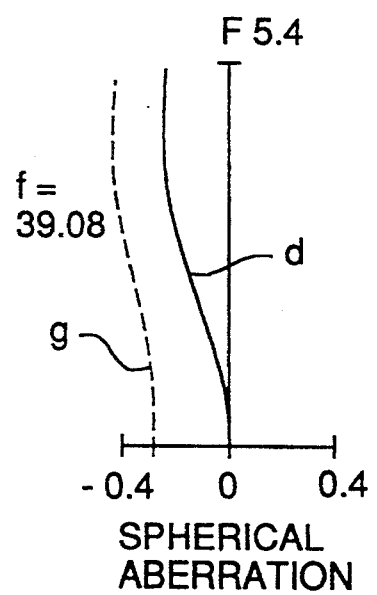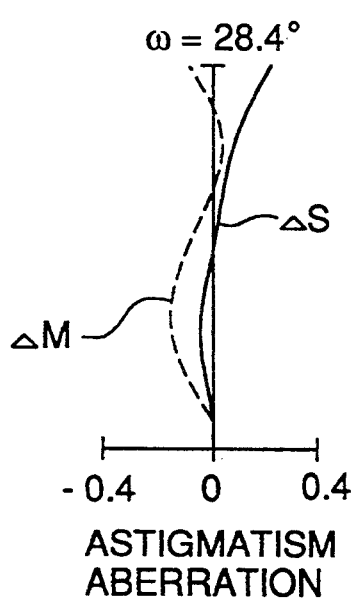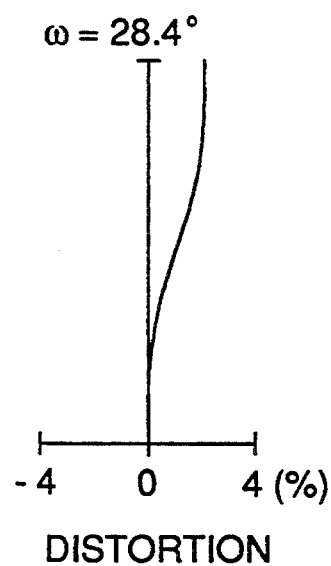
FIG. 10 (a)   FIG. 10 (b)   FIG. 10 (c)

SPHERICAL ABERRATION

ASTIGMATISM ABERRATION

DISTORTION

SPHERICAL ABERRATION

ASTIGMATISM ABERRATION

DISTORTION

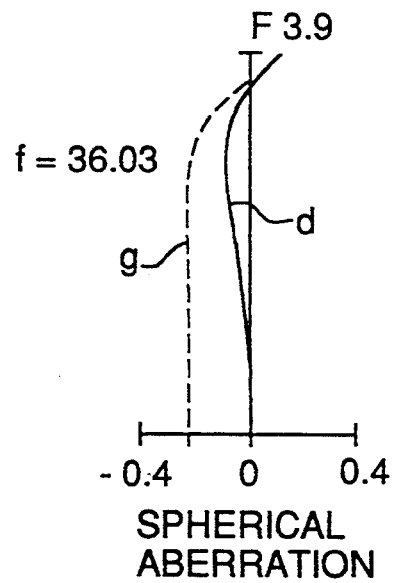
FIG. 13 (a) SPHERICAL ABERRATION
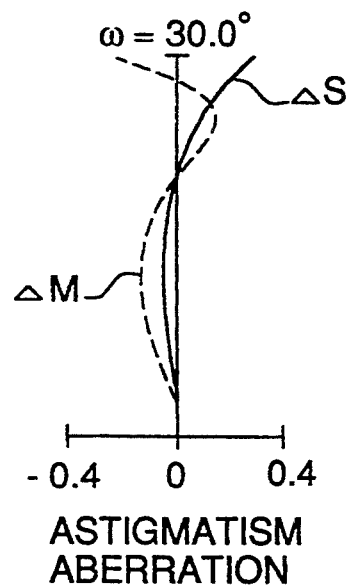
FIG. 13 (b) ASTIGMATISM ABERRATION
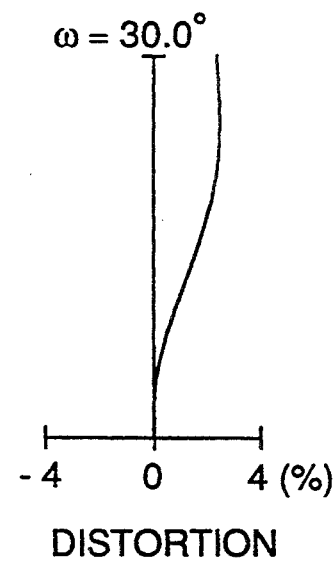
FIG. 13 (c) DISTORTION
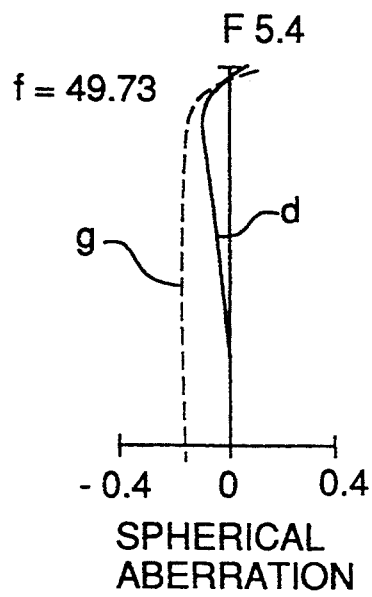
FIG. 13 (d) SPHERICAL ABERRATION
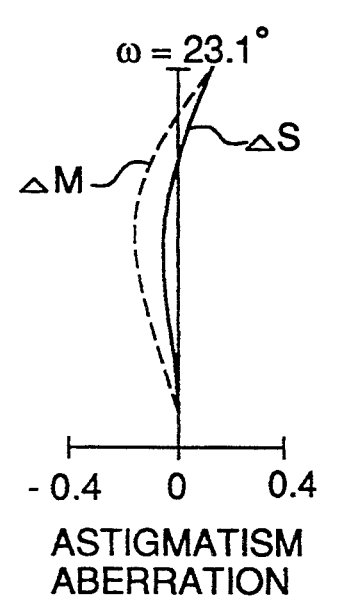
FIG. 13 (e) ASTIGMATISM ABERRATION
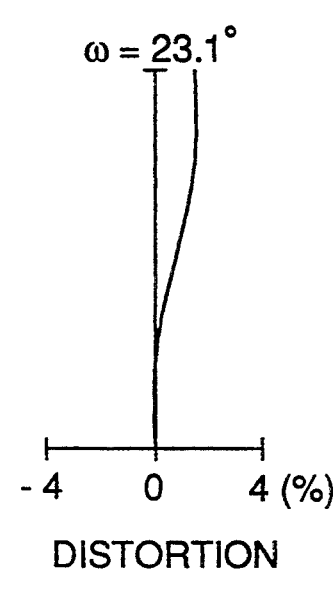
FIG. 13 (f) DISTORTION

SPHERICAL ABERRATION

ASTIGMATISM ABERRATION

DISTORTION

SPHERICAL ABERRATION

ASTIGMATISM ABERRATION

DISTORTION

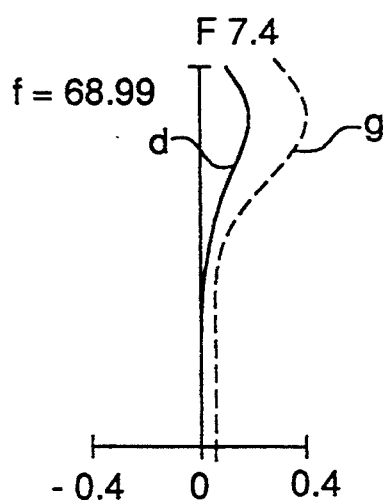
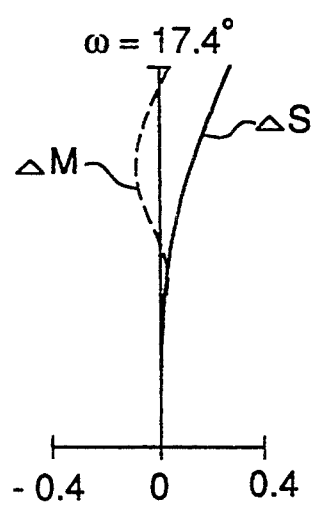
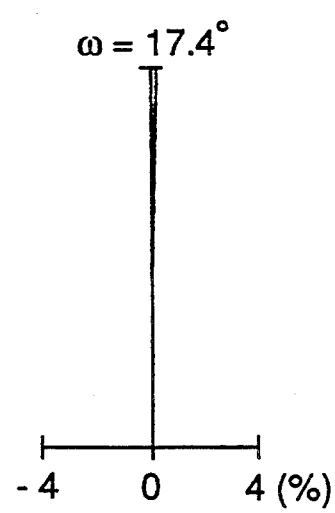
FIG. 14 (g)  FIG. 14 (h)  FIG. 14 (i)

SPHERICAL ABERRATION

ASTIGMATISM ABERRATION

DISTORTION

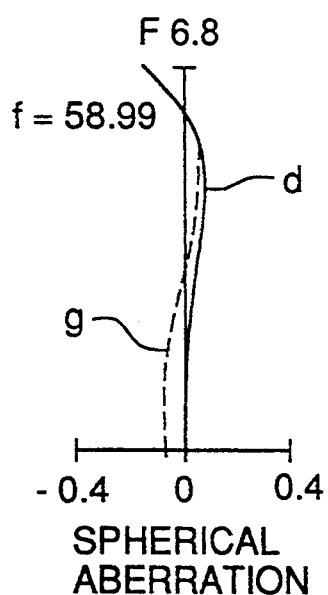 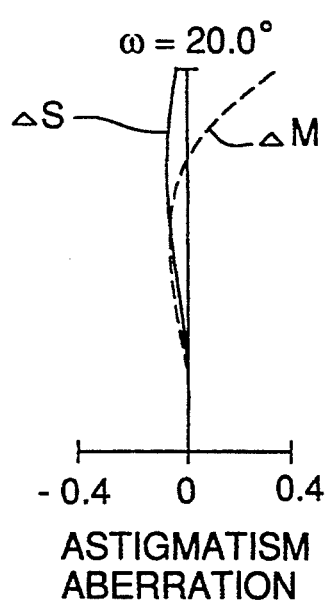 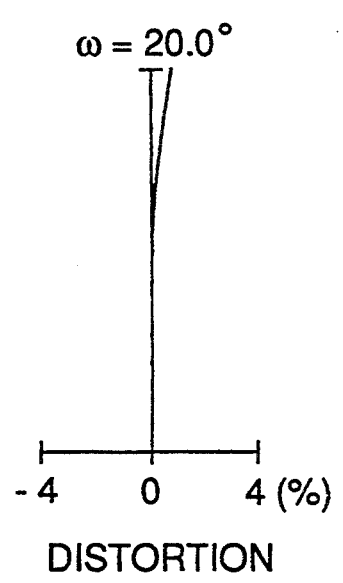
FIG. 18 (g)  FIG. 18 (h)  FIG. 18 (i)

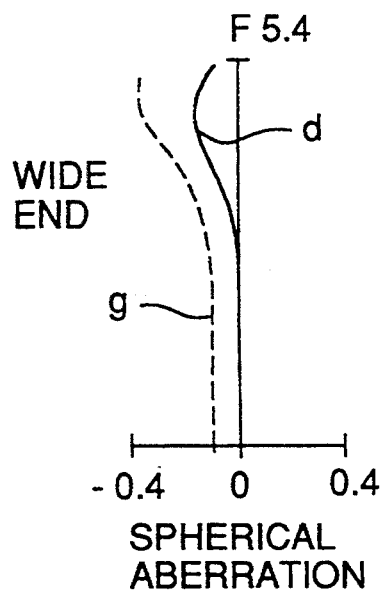
FIG. 20 (a) SPHERICAL ABERRATION
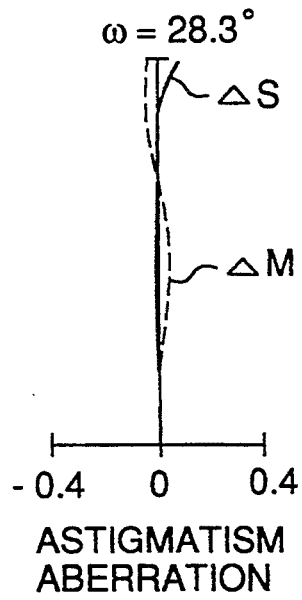
FIG. 20 (b) ASTIGMATISM ABERRATION
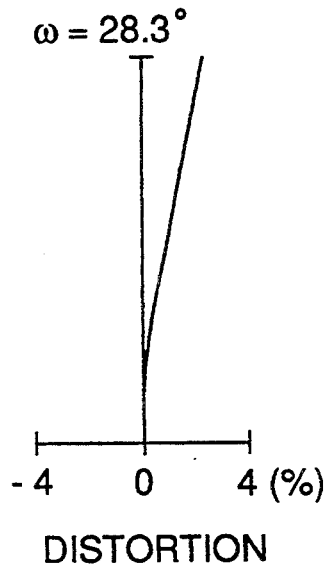
FIG. 20 (c) DISTORTION
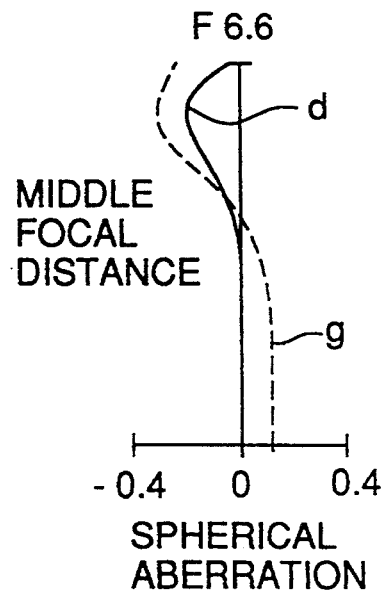
FIG. 20 (d) SPHERICAL ABERRATION
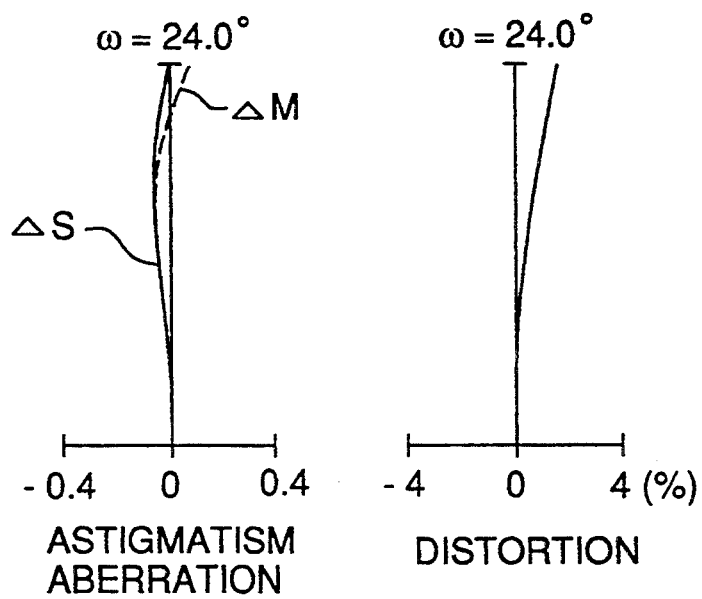
FIG. 20 (e) ASTIGMATISM ABERRATION
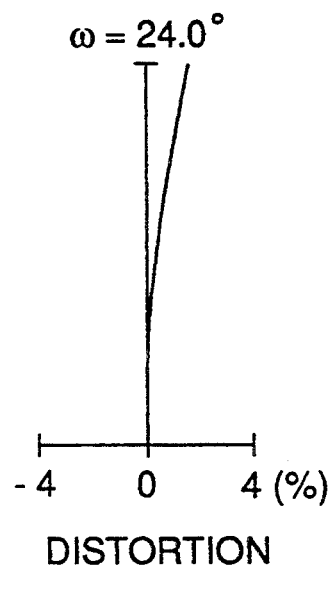
FIG. 20 (f) DISTORTION

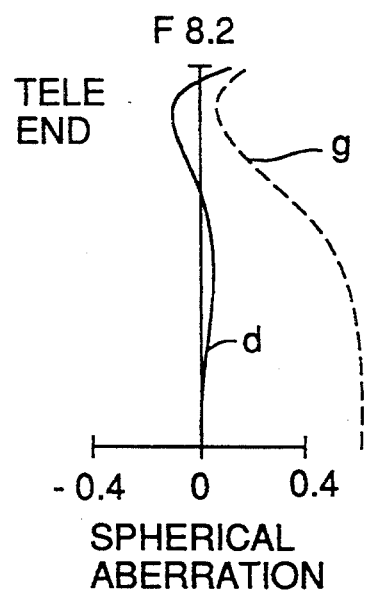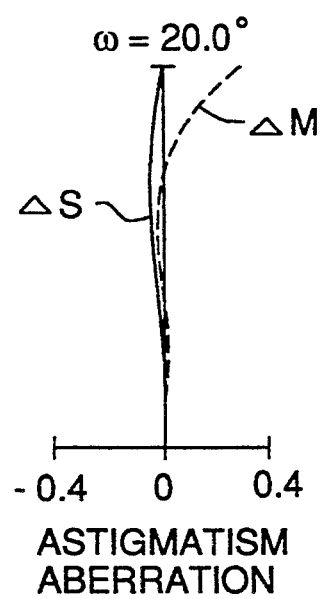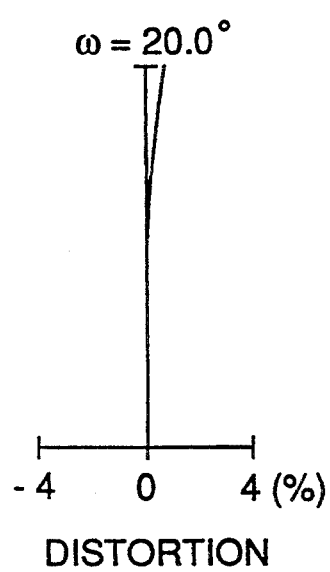
FIG. 20 (g)  FIG. 20 (h)  FIG. 20 (i)

COMPACT ZOOM LENS FOR USE IN A LENS SHUTTER CAMERA

BACKGROUND OF THE INVENTION

The present invention relates to a compact zoom lens, and more particularly relates to a compact zoom lens suitably used in a lens shutter camera.

Recently, in the field of lens shutter cameras, cameras with thin bodies are widely used in the field of single focal length cameras. Even in the field of zoom lens cameras, there is a great demand for thin type cameras. Therefore, a compact zoom lens, the entire length of which is short, is required.

Conventionally, zoom lenses for use in lens shutter cameras, the ratio of variable magnification of which is 1.5 to 2.5, are generally provided with a zoom lens system comprising a first lens group having positive refractive power, and a second lens group having negative refractive power, wherein the first and second lens groups are successively arranged from the object side. For example, the aforementioned zoom lens system is disclosed in Japanese Patent Application Open to Public Inspection No. 128911/1981. The zoom lens of this system features a telephoto structure, short back focal length, and short total lens length, Due to the progress of the technology of collapsible zoom lens barrels, it has become more important to reduce the lens cost rather than to reduce the total lens length. If the zoom lens is composed of a smaller number of unit lenses, the total lens length can be reduced, so that the camera body can be made thinner.

A practical zoom lens meeting the aforementioned demands is disclosed in Japanese Patent Application Open to Public Inspection No. 127008/1991. This zoom lens is composed of a first lens group including 1 to 3 unit lenses, and a second lens group including 1 or 2 unit lenses, so that the total number of lenses is not more than 5.

However, in this case, aspherical lenses of a high refractive index are frequently used. For that reason, it is difficult to reduce the cost. In a zoom lens in which the second lens group is a negative lens, the magnification of the second lens group is increased. Therefore, any error caused in the rear portion of the first lens group is extended, and reaches the image surface. Consequently, error sensitivity of this portion is increased. In general, aspherical lenses are made by means of molding, so that the surface accuracy is low compared with spherical glass lenses made by means of grinding. For that reason, the zoom lens disclosed in the aforementioned Patent Application, in which an aspherical surface is formed in the rear portion of the first lens group, is generally difficult to manufacture.

Recently, there is a demand for close-up photography, and most zoom cameras can take close-up photographs, the photographing magnification of which is approximately 1/10.

In general, however, aberration caused in an optical system is varied when a focusing operation is carried out, and the less the number of lenses, the more the aberration becomes. Therefore, the reduction in the number of lenses was incompatible with the performance of close-up photography.

SUMMARY OF THE INVENTION

It is a primary object of the present invention to provide a compact zoom lens which is easily manufactured, characterized in that: the zoom lens includes a small number of unit lenses, from 4 to 6, so that the entire lens is small and the cost is low; aberration is excellently corrected; and the performance of the lens is hardly changed when a focusing operation is conducted in close-up photographing.

The zoom lens of the present invention includes the first lens group with positive refractive power and the second lens group with negative refractive power, wherein the first and second lens groups are successively disposed from the object side, and the zooming operation for variable magnification is conducted when the distance between the first and the second lens groups is changed. In the aforementioned zoom lens of the present invention, the first lens group is composed of the front component with negative refractive power having at least one aspherical surface, and also composed of the rear component with positive refractive power. In this case, the front component is composed of the first negative lens and the second meniscus lens, the convex surface of which is directed to the image side. At the same time, the following inequality is satisfied:

$$\nu n < 35 \qquad (1)$$

where $\nu n$ is the Abbe's number of the lens which has a stronger negative refractive power of the two lenses in the front component of the first lens group.

In the zoom lens of the present invention, it is preferable that the following conditions are satisfied.

$$0.05 < |\phi_{1a}|/\phi_1 < 0.70 \qquad (2)$$

$$0.80 < \phi_1/|\phi_2| < 1.30 \qquad (3)$$

where $\phi_{1a}$ is refractive power of the negative front lens component in the first lens group ($\phi_{1a} < 0$), $\phi_1$ is refractive power of the first lens group, and $\phi_2$ is refractive power of the second lens group ($\phi_2 < 0$).

As shown in the present invention, in the case of a zoom lens including the first and second lens groups, in order to prevent the occurrence of aberration in the first lens group, the first lens group is generally structured by a triplet type lens component including a positive, a negative and a positive lens component that are successively arranged from the object side, or the first lens group is structured of two components including a negative and a positive lens component. In the case where the entire lens length is limited, the triplet type lens component is advantageous, however, since the restriction on the entire lens length has been alleviated recently, the two group structure is more advantageous for reducing the number of lenses.

In the case where the first lens group is structured by the two components including the negative and positive lenses, much spherical aberration is caused in the rear lens component in the first lens group. In the case where the number of lenses is reduced to be as small as possible, it is effective to correct the aberration with an aspherical surface. As described above, the error sensitivity of the positive rear component is high, so the aspherical surface is preferably applied to the front component that is negative. In this case, the aspherical profile is determined so that the negative refractive power increases as it is separated from the optical axis. However, the curved image surface is inclined to the over-direction by the aspherical surface. Therefore, it is difficult to balance spherical aberration and astigmatism.

Therefore, according to the present invention, the negative front component in the first lens group includes the first lens and the second meniscus lens, the convex surface of which is directed to the image side. The first lens is a negative lens because its height of the principal ray is large and it is effective for correcting astigmatism caused in the rear component of the first lens group. From the same reason, the aforementioned aspherical surface may be used for this lens. When the second lens is a meniscus lens, the convex surface of which is directed to the image side, an excessive correction of spherical aberration can be prevented, so that the spherical aberration and astigmatism can be balanced.

The reason why the second lens is a meniscus lens, the convex surface of which is directed to the image side, is as follows: the increase in eccentric error sensitivity between the first and the second lenses is prevented when the second lens is provided with a meniscus shape so that it does not have a strong positive refractive power, the fourth surface on which the height of rays from an axial object point becomes maximum, is formed into a convex surface so that the spherical aberration in the under direction is caused on the surface.

Formula (1) is concerned to the Abbe's number of one of the lenses of the first lens group, the lens having stronger negative refractive power, and relatively wide dispersion is given to the lens. In the case where the first lens group is divided into two partial lens components as shown in the present invention, the diaphragm is usually disposed close to the rear component of the first lens group in order to prevent the increase in the diameter of the second lens group. Therefore, the magnification chromatic aberration is caused between the front component of the first lens group and the second lens group. The magnification chromatic aberration is caused especially in the second lens group, the height of the principal ray of which is large. Formula (1) is a condition by which the magnification chromatic aberration caused in the second lens group is cancelled, so that the degree of freedom is given to the second lens groups and the aberration correction of the entire lens system can be easily carried out. In the case where the dispersion of the negative lens is decreased exceeding the upper limit of formula (1), it is necessary to correct the magnification chromatic aberration only in the second lens group, which restricts the design of the lens system, and the cost is raised, and further the dimensions of the lens system is disadvantageously increased.

Formula (2) relates to the refractive power of the negative front component in the first lens group. When the refractive power exceeds the lower limit, it becomes difficult to correct spherical aberration and longitudinal chromatic aberration. When the refractive power exceeds the upper limit, the negative refractive power excessively acts on a position not on the optical axis, so that the image surface is curved excessively to the over-direction, and at the same time, the height of rays from an axial object point is increased in the positive rear component, so that spherical aberration of a high order tends to be generated.

Formula (3) relates to a ratio of the refractive power of the first lens group and that of the second group. Formula (2) prescribes the amount of movement of the second lens group in the case of zooming.

When the focal length of the entire system is $f_t$ at the telephoto end, and the focal length is $f_w$ at the wide-angle end, the amount of movement $\Delta X_2$ of the second lens group can be expressed as follows.

$$\Delta X_2 = (\phi_1/|\phi_2|)\cdot(f_t - f_w) \quad (4)$$

In the above formula, $f_t$ and $f_w$ are determined by the lens specification. Therefore, $\Delta X_2$ is controlled by the value of $\phi_1/|\phi_2|$. When $|\phi_2|$ is increased with respect to $\phi_1$ exceeding the lower limit defined by the formula (3), the positive distortion generated in the second lens group is increased. When $|\phi_2|$ is decreased with respect to $\phi_1$ exceeding the upper limit, the value of $\Delta X_2$ is increased, so that the lens dimensions are increased even when the collapsible structure is applied.

The present invention is to provide a second structure of a zoom lens including a first lens group of positive refractive power and a second lens group of negative refractive power, the first and second lens groups being successively arranged from the object side, variable magnification being carried out when the interval of both lens groups is changed, wherein the first lens group includes a front lens component provided with one lens of low refractive power having at least one aspherical surface, and a rear lens component of positive refractive power.

In the zoom lens of the present invention, it is preferable that the following conditions are satisfied.

$$-0.20 < \phi_{1a}/\phi_1 < 0.20 \quad (5)$$

$$0.80 < \phi_1/|\phi_2| < 1.30 \quad (6)$$

where $\phi_{1a}$ is refractive power of the front lens component in the first lens group, $\phi_1$ is refractive power of the first lens group, and $\phi_2$ is refractive power of the second lens group ($\phi_2 < 0$).

As shown in the present invention, in the case of a zoom lens including the first and second lens groups, in order to prevent the occurrence of aberration in the first lens group, the first lens group is generally structured by a triplet type lens component including a positive, a negative and a positive lens component that are successively arranged from the object side, or the first lens group is structured by two components including a negative and a positive lens component. In the case where the entire lens length is limited, the triplet type lens component is advantageous, however, since the restriction on the entire lens length has been alleviated recently, the two groups structure is more advantageous for reducing the number of lenses.

As described above, in the case where the first lens group includes the negative and positive components, the negative front component in the first lens group functions to correct the spherical aberration and astigmatism generated in the positive rear component. When this power becomes too strong, the height at which rays of an on-axial object point cross upon the positive rear component is increased, so that the spherical aberration is disadvantageously increased.

For that reason, in the present invention, the front component in the first lens group is composed of a piece of lens of low refractive power, and at least one aspherical surface is utilized. In this manner, the spherical aberration and astigmatism are corrected. In this case, the profile of the aspherical surface is determined so that the negative refractive power is increased as it is separated from the optical axis. This aspherical surface also functions to cancel the positive distortion that is generated in the second lens group.

Formula (5) relates to the refractive power of the front component in the first lens group. When the negative refractive power is increased exceeding the lower limit, the spherical aberration is increased as described above. When the positive refractive power is increased exceeding the upper limit, the effect of the aspherical surface is reduced, so that the spherical aberration, astigmatism and distortion are deteriorated, and the longitudinal chromatic aberration is also increased.

Formula (6) relates to a ratio of the refractive power of the first lens group and that of the second group. Formula (6) prescribes the amount of movement of the second lens group in the case of zooming.

When the focal distance of the entire system is $f_t$ at the telephoto end, and the focal length is $f_w$ at the wide-angle end, the amount of movement $\Delta X_2$ of the second lens group can be expressed as follows.

$$\Delta X_2 = (\phi_1/|\phi_2|) \cdot (f_t - f_w) \tag{7}$$

In the above formula, $f_t$ and $f_w$ are determined by the lens specification. Therefore, $\Delta X_2$ is controlled by the value of $\phi_1/|\phi_2|$. When $|\phi_2|$ is increased with respect to $\phi_1$ exceeding the lower limit defined by the formula (6), the positive distortion generated in the second lens group is increased. When $|\phi_2|$ is increased with respect to $\phi_1$ exceeding the upper limit, the value of $\Delta X_2$ is increased, so that the lens dimensions are increased even when the collapsible structure is applied.

The present invention is to provide the third structure of a zoom lens including a first lens group of positive refractive power and a second lens group of negative refractive power, the first and second lens groups being successively arranged from the object side, variable magnification being carried out when the interval of both lens groups is changed, wherein the first lens group includes two lenses, the concave surfaces of which are faced to each other, and a diaphragm is provided in the rear of the first lens group.

In the aforementioned zoom lens of the invention including the first positive component and the second negative component, a focusing operation is carried out when the first lens group is moved forward or the second lens group is moved backward. Usually, the focusing operation is carried out when the first lens group is moved, considering the lens diameter and the amount of lens movement. Therefore, in the present invention, the focusing operation is carried out when the first lens group is moved.

The change of aberration is caused during a focusing operation mainly when the object distance for each lens in the focusing lens component is changed. For simplification, it is assumed that all lenses are thin, and the equations of third order aberrations with respect to thin lenses are referred to here. (Reference: "Lens Design Method" by Kichiya Matsui published by Kyoritsu Shuppan Co.)

$$Im = h_m^4 A_m \tag{8}$$

$$IIm = h_m^3 H_m A_m + h_m^2 B_m \tag{9}$$

$$IIIm = h_m^2 H_m^2 A_m + 2 h_m H_m B_m + \phi_m \tag{10}$$

$$IVm = IIIm + Pm \tag{11}$$

$$Vm = h_m H_m^3 A_m + 3 H_m^2 B_m + (H_m/h_m)(3\phi_m + P_m) \tag{12}$$

where
- $I_m$: spherical aberration coefficient of the m-th thin lens
- $II_m$: coma coefficient of the m-th thin lens
- $III_m$: astigmatism coefficient of the m-th thin lens
- $IV_m$: curvature of field coefficient of the m-th lens
- $V_m$: distortion coefficient of the m-th lens
- $h_m$: height of paraxial rays from an on-axial object point at the m-th thin lens
- $H_m$: height of paraxial principal rays at the m-th thin lens
- $\phi_m$: refractive power of the m-th thin lens In the above equations, $A_m$ and $B_m$ are values determined by the profile and position of the object. When the profile is constant, values of $A_m$ and $B_m$ are changed by the position of the object.

As described above, aberration is changed by a focusing operation when the object position is changed, that is, the values of $A_m$ and $B_m$ are changed. Therefore, it can be understood that: in order to reduce the changes of $I_m$ to $V_m$ caused when $A_m$ and $B_m$ are changed, hm and Hm are reduced. In this case, the value of $h_m$ is mainly determined by the zoom type, so that it is necessary to reduce $H_m$. In order to reduce $H_m$, it is preferable that the first lens group is provided with a between-diaphragm type, rather than a behind-diaphragm type. The object of providing the between-diaphragm type can be accomplished when the principal ray of off-axis light flux crosses the optical axis in the first lens group, and it is not necessary to substantially provide the between-diaphragm type in the first lens group. In the case where the diaphragm is provided in the first lens group and moved together with the first lens group for focusing, the mechanism becomes complicated and large-sized. Therefore, the lens can not be made compact and the cost is increased. For that reason, in the present invention, even though the behind-diaphragm type is adopted, the light flux is restricted in the first lens group so that $H_m = 0$.

From the equation (10) expressing the astigmatism coefficient, it can be understood that the value of $III_m$ is $\phi_m$ even when $H_m = 0$. This shows that: when $H_m$ is zero or a small value, $III_m$ does not depend on the profile; and when the value of $\phi_m$ is large, it is necessary to cancel it with other lenses.

When a positive lens is disposed in a position close to $H_m = 0$, and $\phi_m$ is a large positive value, it is cancelled when a negative lens is disposed in a position where the value of height H of the principal ray is large. When the power of this negative lens is $\phi_n$, and the astigmatism coefficient is $III_n$, it is necessary to determine the profile of the negative lens so that the following inequality can be satisfied.

$$|III_n| \geq \phi_n|$$

In the structure in which one aberration coefficient is cancelled by strong positive and negative components, the correction of other aberrations is limited, and further error sensitivity is increased, so that difficulty is caused in the manufacturing process.

On the other hand, in the case where a weak negative lens is disposed in a position close to $H_m = 0$, a positive lens is disposed in a position where the value of height H of the principal ray is large. When the power of this positive lens is $\phi_p$, and the astigmatism coefficient is $III_p$, it is possible to determine the profile of the positive lens so that the following inequality can be satisfied.

$$III_p < \phi_p$$

As a result of the foregoing, the aberration coefficient of each lens can be reduced, and the entire aberration correction can be easily carried out, and further error sensitivity can be reduced.

The above discussion concerns thin lenses. When a surface is considered to be an optical element, the above discussion can be extended to the individual surface.

As a result of the foregoing, in the present invention, two lenses, the concave surfaces of which are faced to each other, are disposed in the first lens group, and the principal ray crosses the optical axis at a position close to the second concave surface. When the lenses are structured in this manner, the first lens group becomes symmetrical with respect to a point of intersection of the principal ray and the optical axis, so that it becomes easy to cancel various aberrations.

BRIEF DESCRIPTION OF THE DRAWINGS

FIGS. 9(a)-(i) are aberration diagrams of Example 4;

FIGS. 20(a)-(i) are aberration curve diagrams in the case where the object distance is infinite in Examples 8 to 10.

DETAILED DESCRIPTION OF THE PREFERRED EMBODIMENTS

Figure 1:
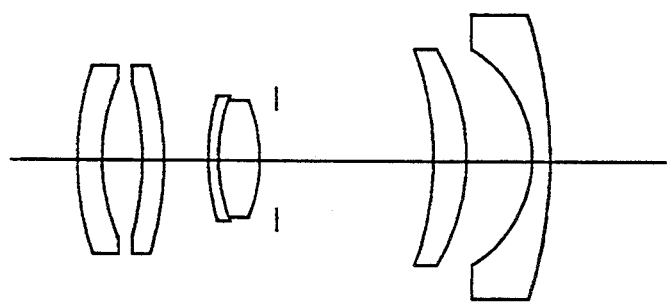
FIG. 1 is a sectional view of Example 1 of the present invention.
Figure 2:
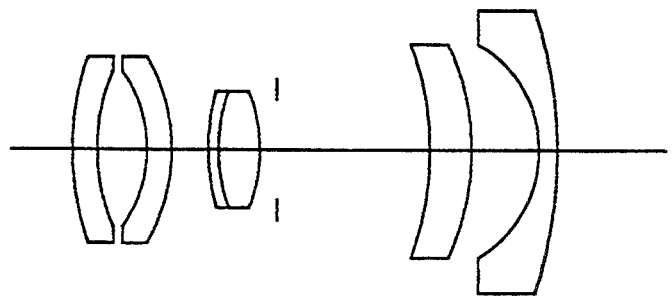
FIG. 2 is a sectional view of Example 2 of the present invention.
Figure 3:
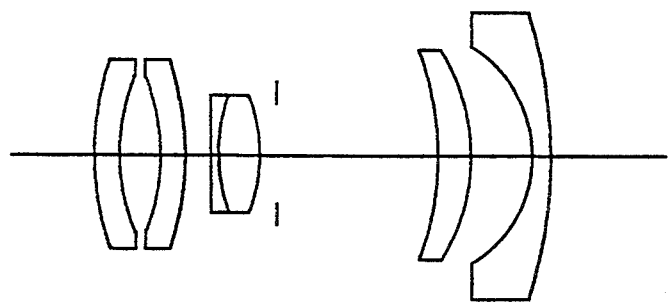
FIG. 3 is a sectional view of Example 3 of the present invention.
Figure 4:
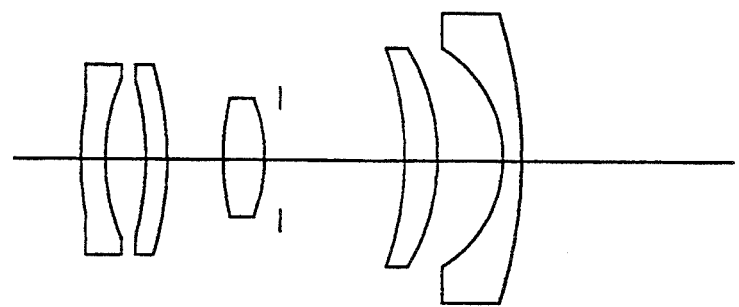
FIG. 4 is a sectional view of Example 4 of the present invention.
Figure 5:
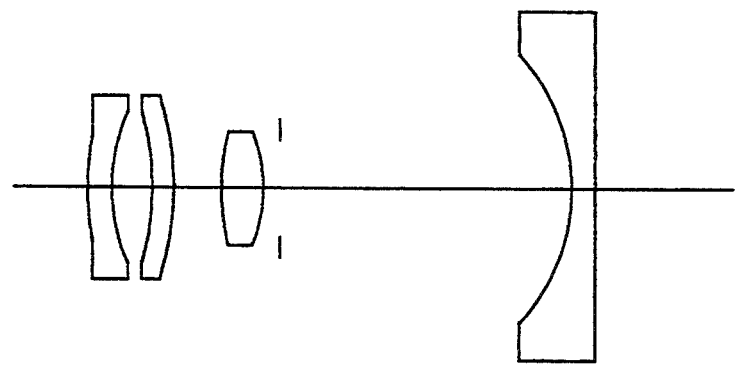
FIG. 5 is a sectional view of Example 5 of the present
Figure 6:
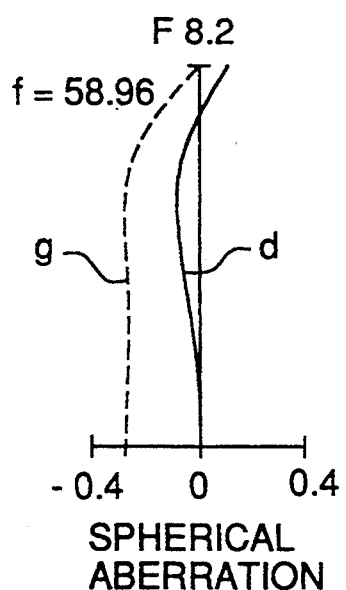
FIGS. 6(a)-(i) are aberration diagrams of Example 1.
Figure 6:
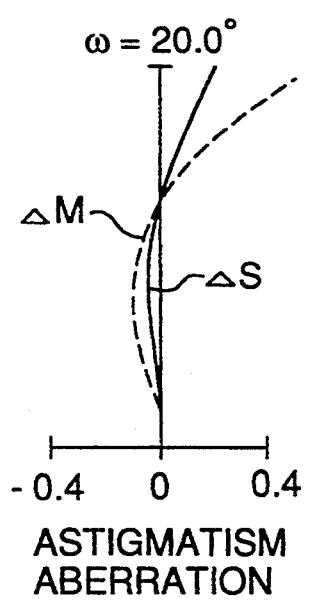
Figure 6:
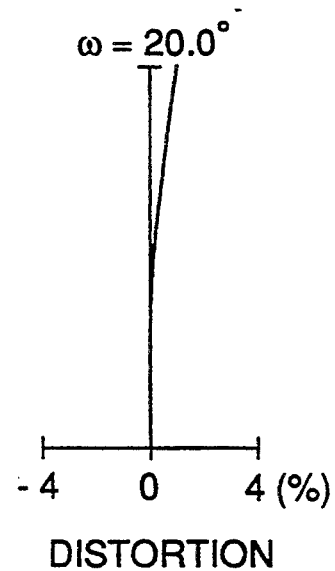
Figure 7:
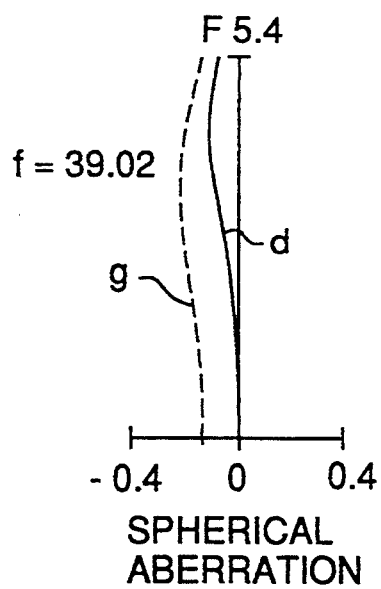
FIGS. 7(a)-(i) are aberration diagrams of Example 2.
Figure 7:
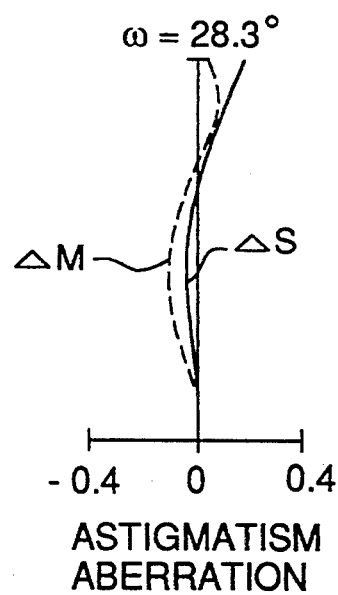
Figure 7:
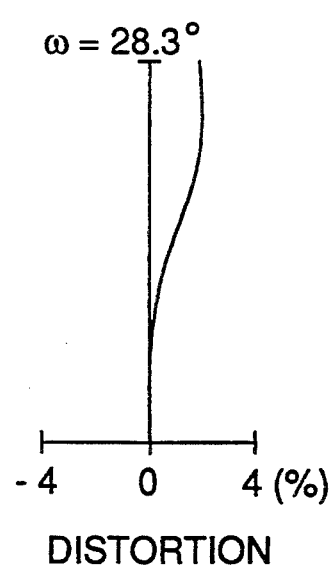
Figure 7:
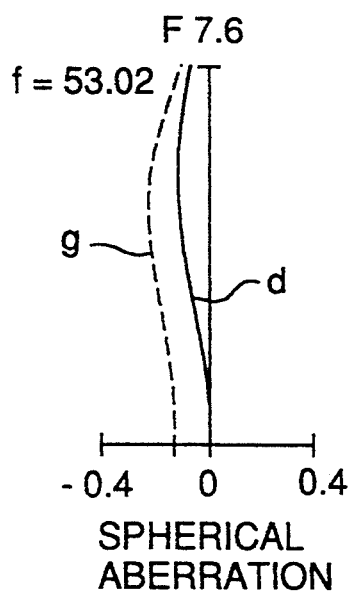
Figure 7:
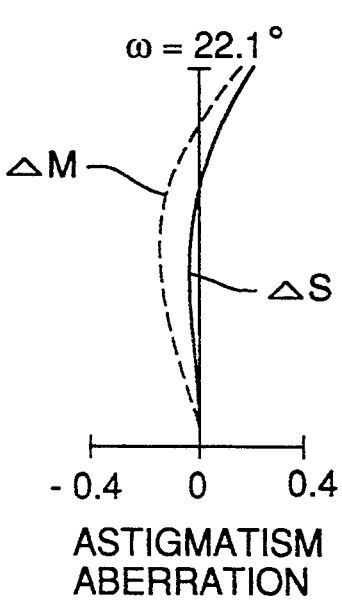
Figure 7:
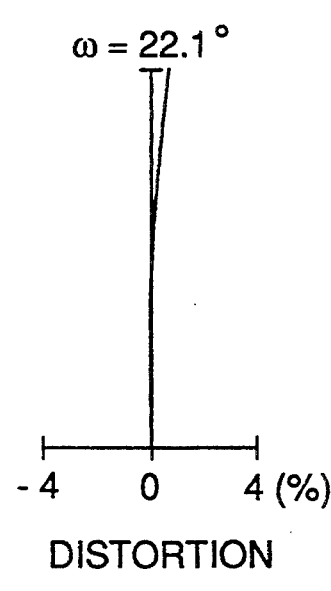
Figure 8:
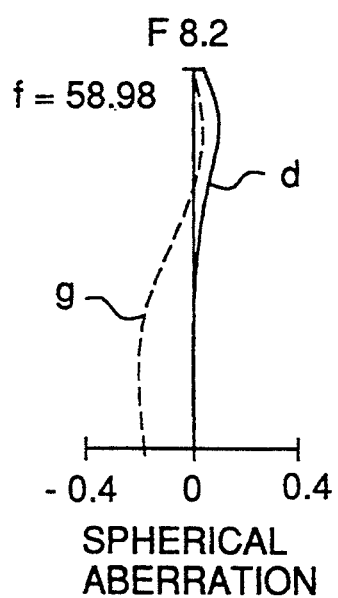
FIGS. 8(a)-(i) are aberration diagrams of Example 3.
Figure 8:
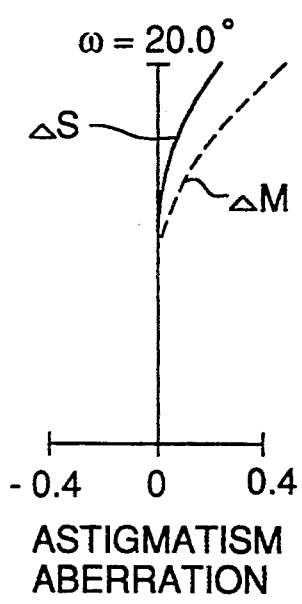
Figure 8:
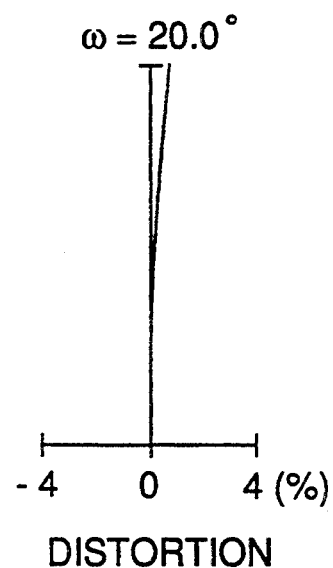
Figure 10:
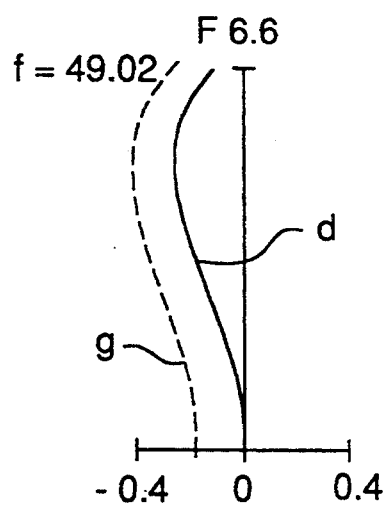
FIGS. 10(a)-(i) are aberration diagrams of Example 5.
Figure 10:
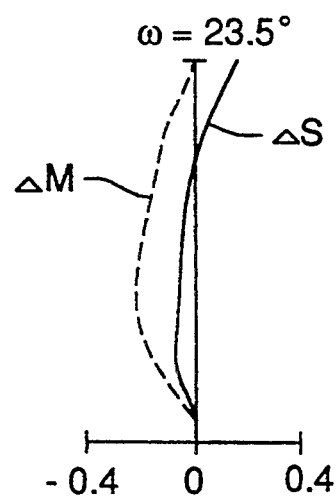
Figure 10:
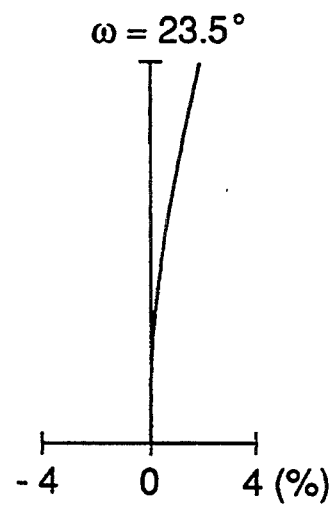
Figure 10:
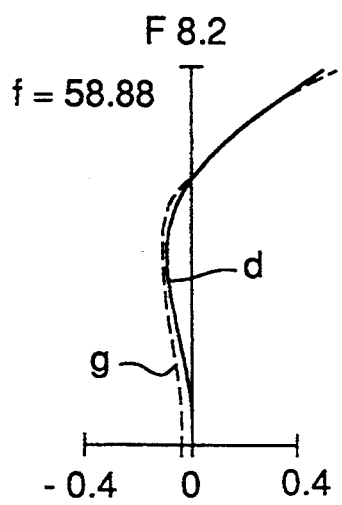
Figure 10:
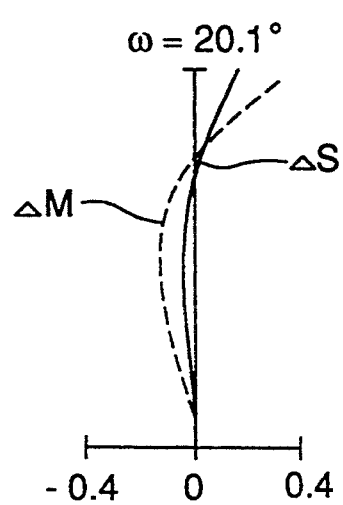
Figure 10:
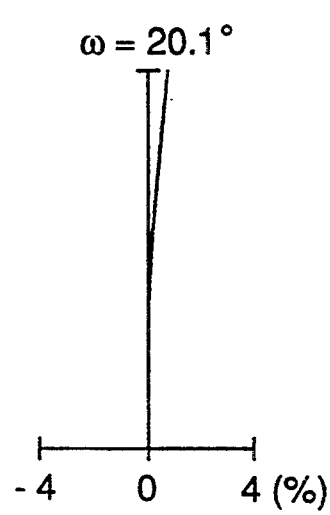
Figure 11:
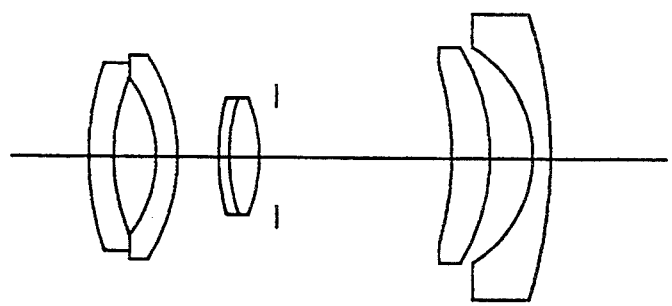
FIG. 11 is a sectional view of Example 6 of the invention.
Figure 12:
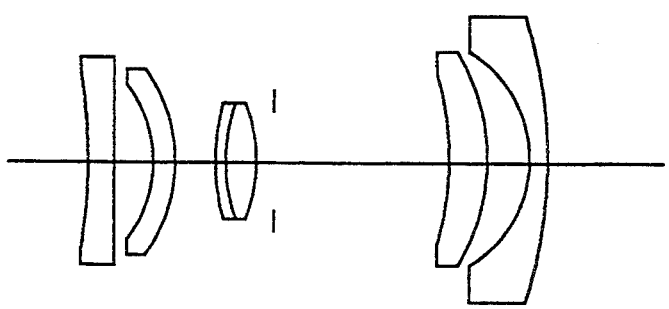
FIG. 12 is a sectional view of Example 7 of the invention.
Figure 13:
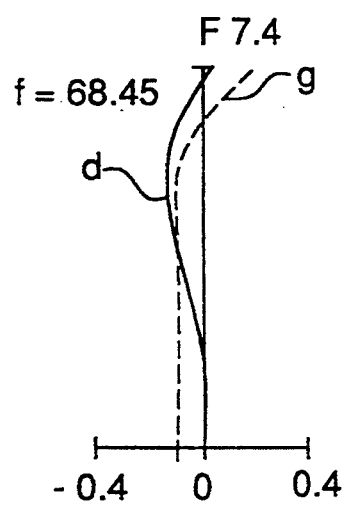
FIGS. 13(a)-(i) are aberration diagrams of Example 6.
Figure 13:
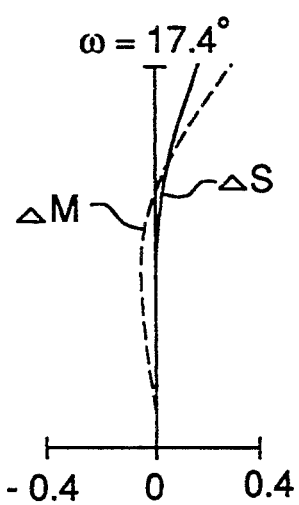
Figure 13:
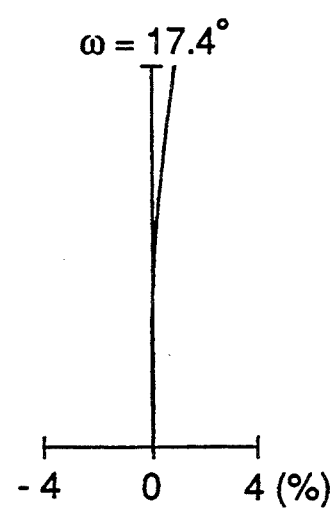
Figure 14:
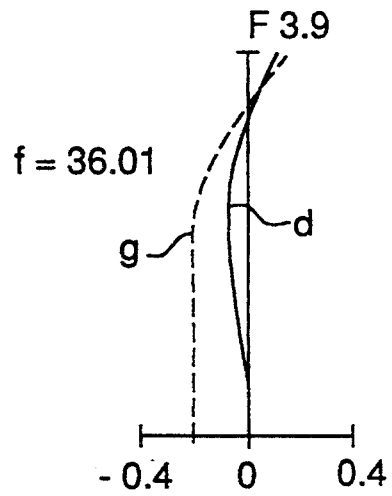
FIGS. 14(a)-(i) are aberration diagrams of Example 7.
Figure 14:
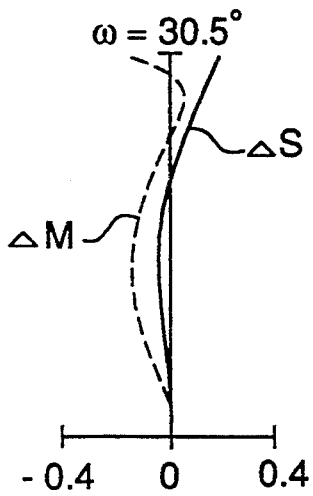
Figure 14:
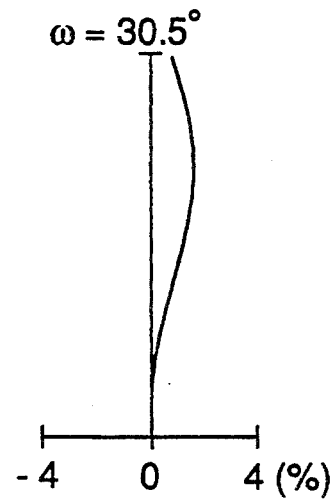
Figure 14:
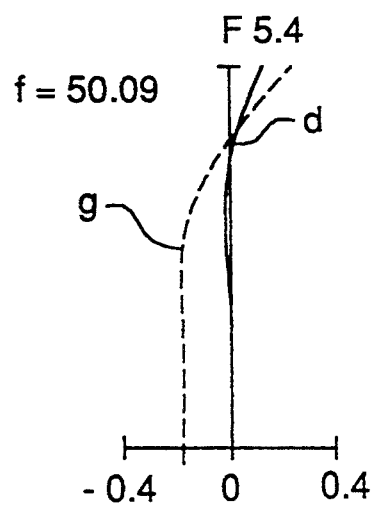
Figure 14:
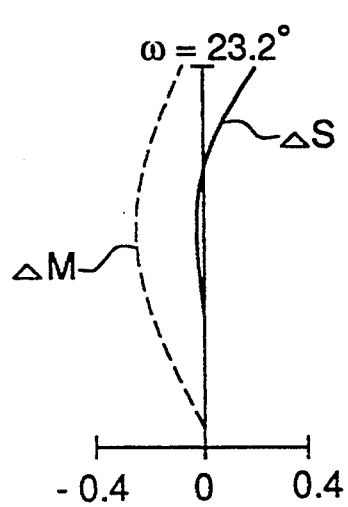
Figure 14:
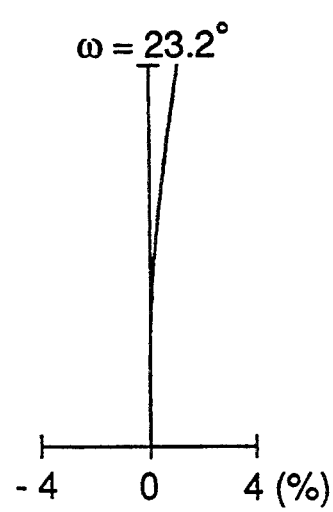
Figure 15:
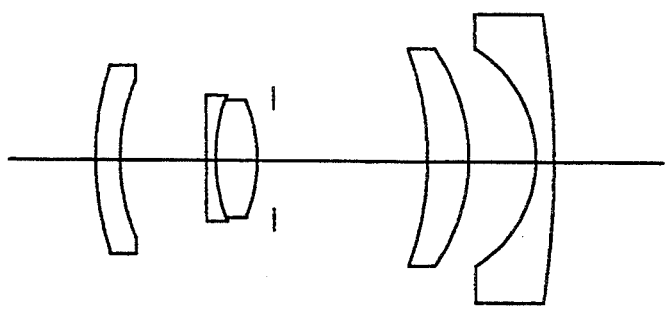
FIG. 15 is a sectional view of Example 8 of the present invent ion.
Figure 16:
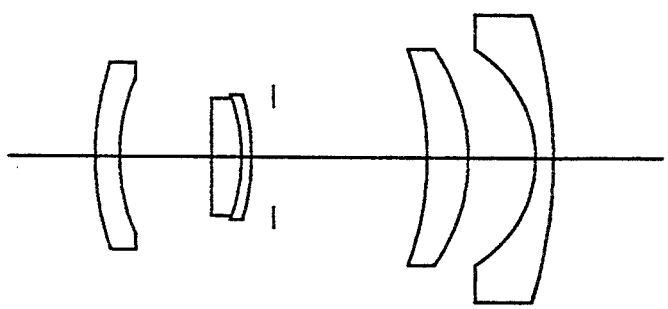
FIG. 16 is a sectional view of Example 9 of the present invent ion.
Figure 17:
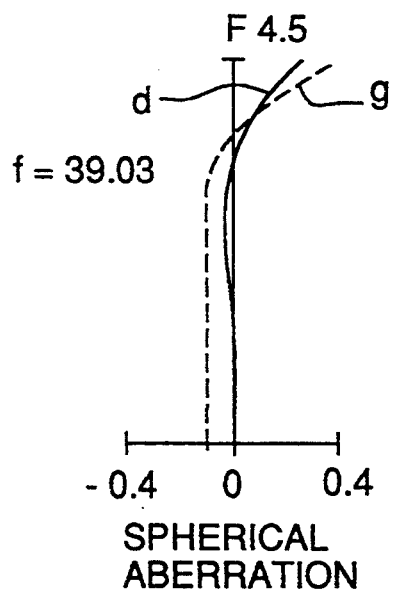
FIGS. 17(a)-(i) are aberration diagrams of Example 8 of the present invention.
Figure 17:
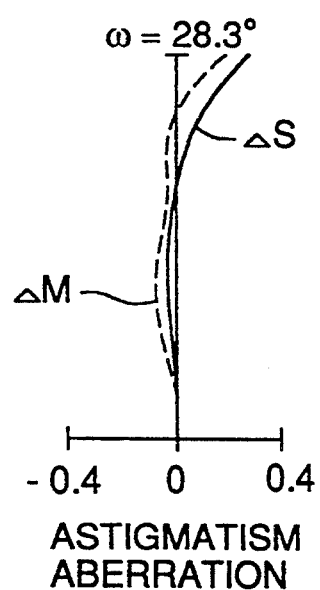
Figure 17:
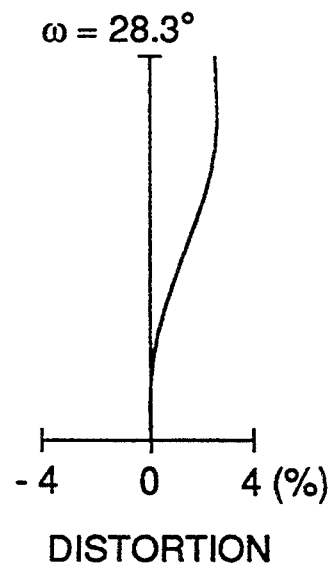
Figure 17:
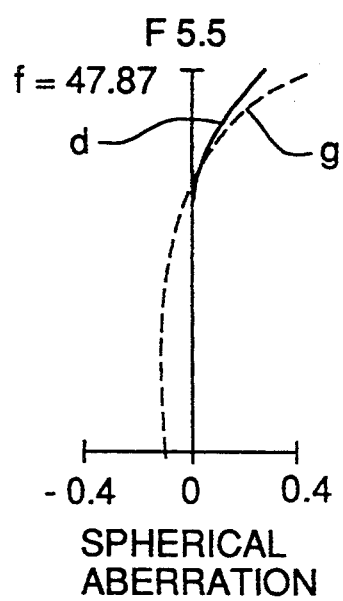
Figure 17:
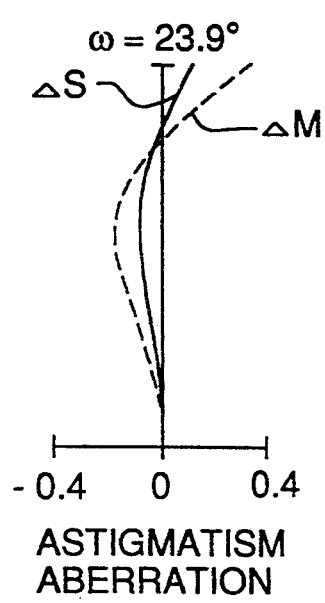
Figure 17:
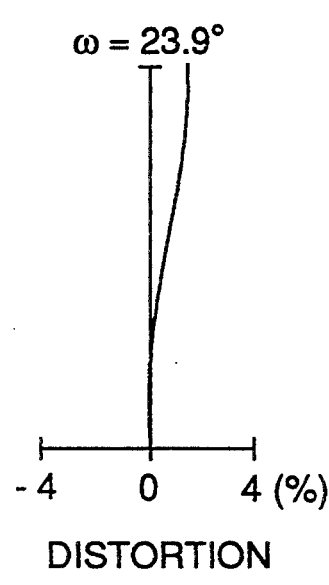
Figure 17:
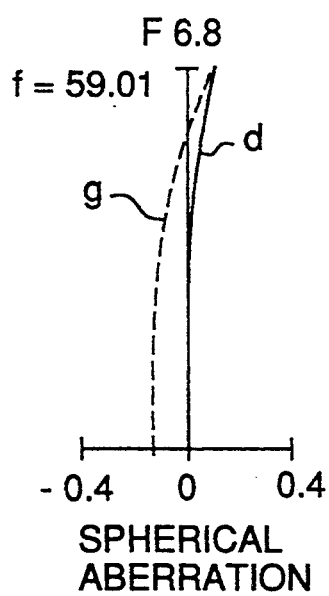
Figure 17:
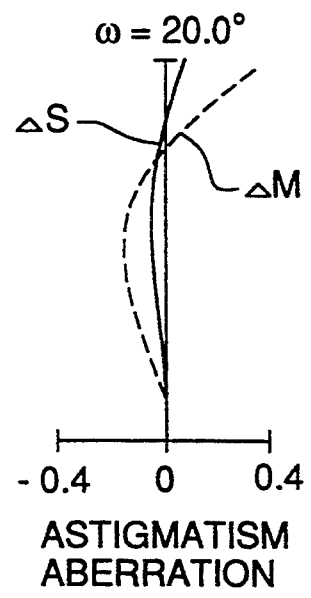
Figure 17:
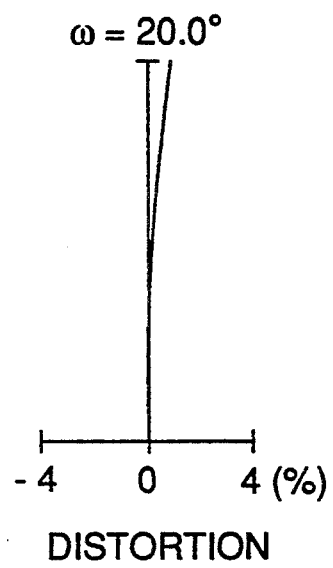
Figure 18:
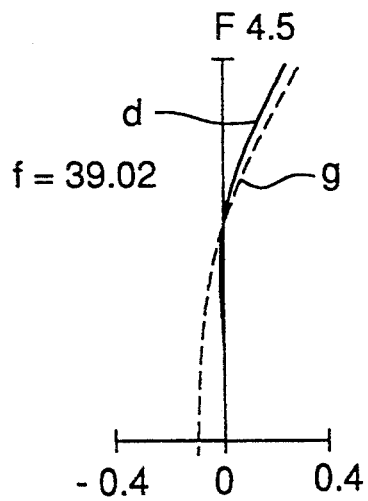
FIGS. 18(a)-(i) are aberration diagrams of Example 9 of the present invention.
Figure 18:
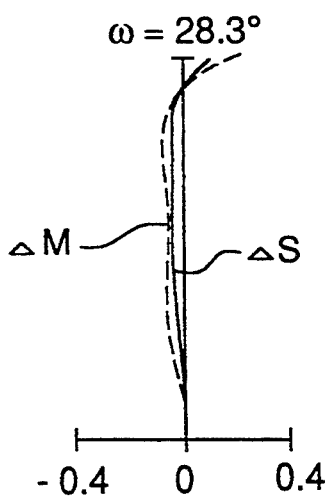
Figure 18:
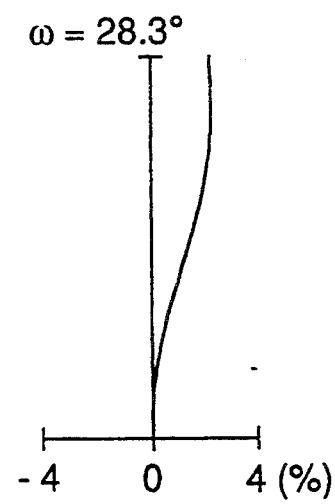
Figure 18:
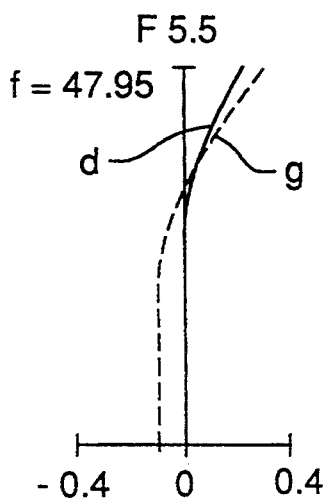
Figure 18:
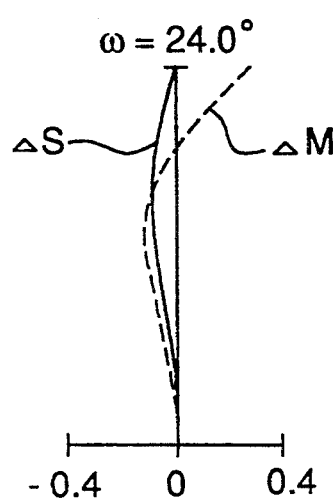
Figure 18:
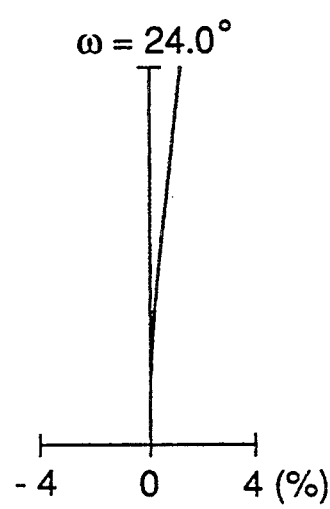

Examples 1 to 7 of the present invention will be explained as follows. In the table, f is a focal distance of the entire lens system, F is an F-number, $\omega$ is a half angle of view, R is a paraxial radius of curvature, D is an on-axis interval of surfaces, N is a refractive index with respect to a d-line, and $v$ is Abbe's number. Mark * represents a aspherical surface. The profile of the aspherical surface can be expressed by Equation 1 wherein the rectangular coordinates are used in which the origin is the vertex of the surface and the X axis is established in the optical axis direction, and wherein the paraxial curvature is c, the conical coefficient is K, and the aspherical coefficient is Ai (i=4, 6, 8).

[Equation 1]
$$X = \frac{ch^2}{1 + \sqrt{1 - (1 + K)c^2 h^2}} + A_4 h^4 + A_6 h^6 + A_8 h^8$$

$$h = \sqrt{Y^2 + Z^2}$$

EXAMPLE 1

| f = 38.99–58.96 F5.4–8.2 2ω = 56.6°–40.0° | | | | |
|---|---|---|---|---|
| Surface No. | R | D | N | v |
| 1* | 23.789 | 1.50 | 1.58300 | 30.0 |
| 2 | 20.031 | 2.00 | | |
| 3 | −16.145 | 1.50 | 1.58300 | 30.0 |
| 4 | −17.114 | 3.00 | | |
| 5 | 59.172 | 0.80 | 1.67270 | 32.1 |
| 6 | 18.958 | 3.00 | 1.51633 | 64.1 |
| 7 | −12.834 | A | | |
| 8 | −36.946 | 2.80 | 1.58300 | 30.0 |
| 9* | −18.068 | 4.15 | | |
| 10 | −9.556 | 1.20 | 1.65844 | 50.9 |
| 11 | −93.747 | | | |

| f | A |
|---|---|
| 38.99 | 10.05 |
| 47.73 | 7.24 |
| 58.96 | 4.85 |

Aspherical surface coefficient

| First surface | | Ninth surface | |
|---|---|---|---|
| K = | 0.96015 | K = | 0 |
| $A_4$ = | −0.12086 × 10$^{-3}$ | $A_4$ = | −0.59803 × 10$^{-4}$ |
| $A_6$ = | −0.15357 × 10$^{-5}$ | $A_6$ = | −0.47589 × 10$^{-6}$ |
| $A_8$ = | 0 | $A_8$ = | −0.60761 × 10$^{-8}$ |
| $|\phi_{1a}|/\phi_1 = 0.117$ | | $\phi_1/|\phi_2| = 0.97$ | |

EXAMPLE 2

| f = 39.02–69.05 F5.4–9.5 2ω = 56.7°–34.8° | | | | |
|---|---|---|---|---|
| Surface No. | R | D | N | v |
| 1* | 35.727 | 1.50 | 1.58300 | 30.0 |
| 2 | 25.259 | 2.00 | | |
| 3* | −13.000 | 1.50 | 1.49200 | 57.0 |
| 4 | −14.808 | 3.00 | | |
| 5 | 37.908 | 0.80 | 1.62004 | 36.3 |
| 6 | 15.625 | 3.00 | 1.51633 | 64.1 |
| 7 | −14.475 | A | | |
| 8* | −38.402 | 3.80 | 1.58300 | 30.0 |
| 9 | −22.163 | 4.58 | | |
| 10 | −10.460 | 1.20 | 1.65844 | 50.9 |
| 11 | −60.305 | | | |

| f | A |
|---|---|
| 39.02 | 11.45 |
| 53.02 | 6.93 |
| 69.05 | 4.01 |

Aspherical surface coefficient

| First surface | | Third surface | |
|---|---|---|---|
| K = | 0.53539 | K = | 0.89031 |
| $A_4$ = | −0.10701 × 10$^{-3}$ | $A_4$ = | 0.71121 × 10$^{-4}$ |
| $A_6$ = | −0.49724 × 10$^{-6}$ | $A_6$ = | −0.11869 × 10$^{-6}$ |

-continued

| | | | |
|---|---|---|---|
| $A_8 =$ | 0 | $A_8 =$ | 0 |

Eighth surface
$K = 0$
$A_4 = 0.50685 \times 10^{-4}$
$A_6 = 0.15302 \times 10^{-6}$
$A_8 = 0.34529 \times 10^{-8}$
$|\phi_{1a}|/\phi_1 = 0.244$    $\phi_1/|\phi_2| = 0.01$

EXAMPLE 3

$f = 39.01\text{–}58.98$   F5.4–8.2   $2\omega = 56.9°\text{–}40.0°$

| Surface No. | R | D | N | $\nu$ |
|---|---|---|---|---|
| 1* | 20.000 | 1.50 | 1.58300 | 30.0 |
| 2 | 18.000 | 1.80 | | |
| 3 | −18.000 | 1.50 | 1.58300 | 30.0 |
| 4* | −20.000 | 3.00 | | |
| 5 | 125.940 | 0.80 | 1.67270 | 32.1 |
| 6 | 22.226 | 3.00 | 1.51633 | 64.1 |
| 7 | −10.993 | A | | |
| 8 | −28.401 | 2.80 | 1.58300 | 30.0 |
| 9* | −15.595 | 3.83 | | |
| 10 | −8.866 | 1.20 | 1.65844 | 50.9 |
| 11 | −67.663 | | | |

| f | A |
|---|---|
| 39.01 | 9.31 |
| 48.07 | 6.70 |
| 58.98 | 4.63 |

Aspherical surface coefficient

| First surface | Fourth surface |
|---|---|
| $K = 0$ | $K = 0$ |
| $A_4 = -0.85000 \times 10^{-4}$ | $A_4 = 0.85000 \times 10^{-4}$ |
| $A_6 = -0.95000 \times 10^{-6}$ | $A_6 = 0.95000 \times 10^{-6}$ |
| $A_8 = 0$ | $A_8 = 0$ |

Ninth surface
$K = 0$
$A_4 = -0.81359 \times 10^{-4}$
$A_6 = -0.62893 \times 10^{-6}$
$A_8 = -0.11203 \times 10^{-7}$
$|\phi_{1a}|/\phi_1 = 0.11$    $\phi_1/|\phi_2| = 0.97$

EXAMPLE 4

$f = 39.03\text{–}59.09$   F5.4–8.2   $2\omega = 58.0°\text{–}40.7°$

| Surface No. | R | D | N | $\nu$ |
|---|---|---|---|---|
| 1* | 37.025 | 1.50 | 1.58300 | 30.0 |
| 2 | 17.144 | 2.00 | | |
| 3 | −15.926 | 1.50 | 1.58300 | 30.0 |
| 4* | −18.135 | 3.00 | | |
| 5 | 36.605 | 3.00 | 1.48749 | 70.2 |
| 6 | −11.519 | A | | |
| 7 | −25.392 | 2.80 | 1.49200 | 57.0 |
| 8* | −12.584 | 3.15 | | |
| 9 | −9.518 | 1.20 | 1.65844 | 50.9 |
| 10 | −73.752 | | | |

| f | A |
|---|---|
| 39.03 | 10.14 |
| 48.10 | 7.11 |
| 59.09 | 4.68 |

Aspherical surface coefficient

| First surface | Fourth surface |
|---|---|
| $K = 0.30871 \times 10$ | $K = 0$ |
| $A_4 = -0.16594 \times 10^{-3}$ | $A_4 = 0.21702 \times 10^{-4}$ |
| $A_6 = -0.40124 \times 10^{-6}$ | $A_6 = 0.21110 \times 10^{-5}$ |
| $A_8 = 0$ | $A_8 = 0$ |

Eighth surface
$K = 0$
$A_4 = -0.32581 \times 10^{-4}$
$A_6 = -0.94637 \times 10^{-7}$
$A_8 = -0.67484 \times 10^{-8}$
$|\phi_{1a}|/\phi_1 = 0.479$    $\phi_1/|\phi_2| = 1.16$

EXAMPLE 5

$f = 39.08\text{–}58.88$   F5.4–8.2   $2\omega = 56.7°\text{–}40.1°$

| Surface No. | R | D | N | $\nu$ |
|---|---|---|---|---|
| 1* | 51.085 | 1.50 | 1.58300 | 30.0 |
| 2 | 27.686 | 2.00 | | |
| 3 | −15.695 | 1.50 | 1.58300 | 30.0 |
| 4* | −21.513 | 3.00 | | |
| 5 | 49.394 | 3.00 | 1.48749 | 70.2 |
| 6 | −12.980 | A | | |
| 7* | −15.737 | 2.00 | 1.49200 | 57.0 |
| 8 | −322.230 | | | |

| f | A |
|---|---|
| 39.08 | 23.49 |
| 49.02 | 18.46 |
| 58.88 | 15.15 |

Aspherical surface coefficient

| First surface | Fourth surface |
|---|---|
| $K = 0.49595 \times 10$ | $K = -0.71268 \times 10$ |
| $A_4 = -0.10402 \times 10^{-3}$ | $A_4 = -0.87871 \times 10^{-4}$ |
| $A_6 = -0.58816 \times 10^{-6}$ | $A_6 = 0.12684 \times 10^{-5}$ |
| $A_8 = 0$ | $A_8 = 0$ |

Seventh surface
$K = 0$
$A_4 = -0.17132 \times 10^{-4}$
$A_6 = -0.52534 \times 10^{-7}$
$A_8 = 0.51979 \times 10^{-9}$
$|\phi_{1a}|/\phi_1 = 0.527$    $\phi_1/|\phi_2| = 1.17$
$f_w \cdot |\phi_2| = 1.16$

EXAMPLE 6

$f = 36.03\text{–}68.45$   F3.9–7.4   $2\omega = 60.0°\text{–}34.8°$

| Surface No. | R | D | N | $\nu$ |
|---|---|---|---|---|
| 1* | 38.140 | 1.50 | 1.58300 | 30.0 |
| 2 | 30.109 | 2.00 | | |
| 3* | −12.451 | 1.50 | 1.58300 | 30.0 |
| 4 | −13.136 | 3.00 | | |
| 5 | 42.264 | 0.80 | 1.62004 | 36.3 |
| 6 | 16.188 | 3.00 | 1.48749 | 70.2 |
| 7 | −13.420 | A | | |
| 8* | −40.381 | 2.86 | 1.58300 | 30.0 |
| 9 | −22.740 | 4.46 | | |
| 10 | −9.897 | 1.20 | 1.71300 | 53.9 |
| 11 | −53.394 | | | |

| f | A |
|---|---|
| 36.03 | 11.94 |
| 49.73 | 7.73 |
| 68.45 | 4.70 |

Aspherical coefficient

| First surface | Third surface |
|---|---|
| $K = -0.62371$ | $K = 0.11010 \times 10$ |
| $A_4 = -0.11580 \times 10^{-3}$ | $A_4 = 0.75870 \times 10^{-4}$ |
| $A_6 = -0.86652 \times 10^{-6}$ | $A_6 = 0.84380 \times 10^{-5}$ |
| $A_8 = 0$ | $A_8 = 0$ |

Eighth surface
$K = 0$
$A_4 = 0.73028 \times 10^{-4}$
$A_6 = 0.70097 \times 10^{-7}$
$A_8 = 0.65497 \times 10^{-8}$
$|\phi_{1a}|/\phi_1 = 0.094$    $\phi_1/|\phi_2| = 0.91$

EXAMPLE 7

| Surface No. | R | D | N | v |
|---|---|---|---|---|
| 1* | −50.000 | 1.50 | 1.58300 | 30.0 |
| 2 | −251.018 | 1.50 | | |
| 3* | −12.236 | 1.50 | 1.58300 | 30.0 |
| 4 | −11.911 | 3.00 | | |
| 5 | 34.631 | 0.80 | 1.62004 | 36.3 |
| 6 | 15.016 | 3.00 | 1.48749 | 70.2 |
| 7 | −13.879 | A | | |
| 8* | −43.870 | 2.86 | 1.58300 | 30.0 |
| 9 | −24.496 | 4.45 | | |
| 10 | −9.671 | 1.20 | 1.71300 | 53.9 |
| 11 | −52.563 | | | | f = 36.01–68.99  F3.9 = 7.4  2ω = 61.1°–34.7°

| f | A |
|---|---|
| 36.01 | 11.33 |
| 50.09 | 7.43 |
| 68.99 | 4.70 |

Aspherical coefficient

First surface
- $K = 0.62716 \times 10$
- $A_4 = -0.17642 \times 10^{-3}$
- $A_6 = 0.24266 \times 10^{-6}$
- $A_8 = 0$ Third surface
- $K = 0.81811$
- $A_4 = 0.93811 \times 10^{-4}$
- $A_6 = -0.48503 \times 10^{-6}$
- $A_8 = 0$ Eighth surface
- $K = 0$
- $A_4 = 0.78990 \times 10^{-4}$
- $A_6 = 0.10881 \times 10^{-6}$
- $A_8 = 0.72483 \times 10^{-8}$ $|\phi_{1a}|/\phi_1 = 0.124$   $\phi_1/|\phi_2| = 0.91$ In these examples, aspherical surfaces are used in the second lens group. In Example 1 to Example 4, and also in Example 6 and 7, the aspherical surfaces are determined so that the off-axis negative refractive power of the entire second lens group can be weakened, and positive distortion is corrected in the position of wide angle.

On the other hand, in Example 5 in which the second lens group is composed of one piece of negative lens, the aspherical surface is used so that the off-axis negative refractive power can be strengthened in order to prevent the image surface from inclining to the "under" direction in an intermediate focal length. At this time, positive distortion tends to occur in the second lens group. Therefore, when the second lens group is composed of one piece of negative lens, the following conditions may be satisfied.

$$1.00 < f_w \cdot |\phi_2| < 1.30 \quad (13)$$

Equation (13) relates to the refractive power of the second lens group. When $|\phi_2|$ is reduced and exceeds the lower limit, the amount of movement of the second lens group is increased, so that the dimensions of the lens need to be increased. When $|\phi_2|$ is increased and exceeds the upper limit, the positive distortion is increased in the wide angle position. In Example 5 described before, $f_w \cdot |\phi_2| = 1.16$.

In the case where the rear lens component in the first lens group is composed of one piece of positive lens as shown in Examples 4 and 5, the following equation, shown in equation (2), is preferably utilized.

$$0.30 < |\phi_{1a}| < 0.70 \quad (14)$$

Equation (14) is a condition for giving a stronger negative refractive power to the front lens component and effectively correcting the longitudinal chromatic aberration.

In the third example, the negative lens component in the first lens group includes two pieces of negative lenses, the profile and material of which are the same. As a result of the foregoing, the manufacturing cost can be reduced when the lenses are made by means of molding.

Although the F-number is 5.4 at the wide-angle end of the lens in the aforementioned examples, a brighter lens can be provided without applying new technology when the number of lenses is increased or an aspherical lens of high refractive index is used. Examples 8 and 9 are shown below. In the table, f is a focal length of the entire lens system, F is an F-number, ω is a half angle of view, R is a paraxial radius of curvature, D is an on-axis interval of surfaces, N is a refractive index with respect to a d-line, and v is Abbe's number. Mark * represents an aspherical surface. The profile of the aspherical surface can be expressed by Equation 2 wherein the rectangular coordinates are used in which the origin is the vertex of the surface and the X axis is established in the optical axis direction, and wherein the paraxial curvature is c, the conical coefficient is K, and the aspherical coefficient is $A_i$ (i=4, 6, 8).

$$X = \frac{ch^2}{1 + \sqrt{1 - (1 + K)c^2h^2}} + A_4h^4 + A_6h^6 + A_8h^8 + A_{10}h^{10} \quad \text{[Equation 2]}$$

$$h = \sqrt{Y^2 + Z^2}$$

EXAMPLE 8

| Surface No. | R | D | N | v |
|---|---|---|---|---|
| 1* | 20.000 | 2.00 | 1.58300 | 30.0 |
| 2 | 21.121 | 6.00 | | |
| 3 | −789.940 | 0.70 | 1.78472 | 25.7 |
| 4 | 30.188 | 2.00 | 1.58913 | 61.2 |
| 5 | −12.974 | A | | |
| 6 | −35.699 | 3.00 | 1.58300 | 30.0 |
| 7* | −15.525 | 3.12 | | |
| 8 | −8.538 | 1.20 | 1.56883 | 56.3 |
| 9 | −121.190 | | | | f = 39.03–59.01  F4.5–6.8  2ω = 56.6°–40.0°

| f | A |
|---|---|
| 39.03 | 9.45 |
| 47.87 | 6.15 |
| 59.01 | 3.40 |

Aspherical surface coefficient

First surface
- $K = 0.83474$
- $A_4 = -0.11658 \times 10^{-3}$
- $A_6 = -0.67049 \times 10^{-6}$
- $A_8 = -0.16389 \times 10^{-7}$
- $A_{10} = 0.90363 \times 10^{-10}$ Seventh surface
- $K = 0$
- $A_4 = -0.93830 \times 10^{-4}$
- $A_6 = -0.50183 \times 10^{-6}$
- $A_8 = -0.10759 \times 10^{-7}$
- $A_{10} = -0.15165 \times 10^{-9}$ $\phi_{1a}/\phi_1 = 0.07$   $\phi_1/|\phi_2| = 1.04$

EXAMPLE 9

| Surface No. | R | D | N | v |
|---|---|---|---|---|
| 1* | 20.000 | 2.00 | 1.49200 | 57.0 |
| 2 | 21.591 | 5.80 | | |
| 3 | −174.630 | 2.50 | 1.58913 | 61.2 |
| 4 | −8.989 | 0.70 | 1.78472 | 25.7 |
| 5 | −12.465 | A | | | f = 39.02–58.99  F4.5–6.8  2ω = 56.6°–40.1°

-continued

| 6 | −23.545 | 3.00 | 1.58300 | 30.0 |
| 7* | −14.443 | 3.78 | | |
| 8 | −8.722 | 1.20 | 1.56883 | 56.3 |
| 9 | −57.066 | | | |

| f | A |
|---|---|
| 39.02 | 9.24 |
| 47.95 | 5.89 |
| 58.99 | 3.14 |

Aspherical surface coefficient

| First surface | Seventh surface |
|---|---|
| K = 0.39012 × 10 | K = 0 |
| $A_4$ = −0.16901 × $10^{-3}$ | $A_4$ = −0.71096 × $10^{-4}$ |
| $A_6$ = −0.10774 × $10^{-5}$ | $A_6$ = −0.10109 × $10^{-6}$ |
| $A_8$ = −0.16737 × $10^{-7}$ | $A_8$ = −0.20585 × $10^{-7}$ |
| $A_{10}$ = 0.80349 × $10^{-11}$ | $A_{10}$ = 0.17804 × $10^{-10}$ |
| $\phi_{1a}/\phi_1$ = 0.07 | $\phi_1/|\phi_2|$ = 1.08 |

In both examples, in order to correct the longitudinal chromatic aberration, the rear lens component in the first lens group includes one positive and one negative lens. An aspherical surface is used for the second lens group so that the off-axis negative refractive power can be reduced as the entire second lens component. In this manner, positive distortion is corrected at the wide-angle position.

As explained above, the zoom lens of the present invention is composed of an extremely small number of lenses, and the entire lens length is short and the manufacturing cost is low. In spite of the aforementioned advantages, the aberration of the zoom lens can be excellently corrected over the entire variable magnification range, and the lens can be made compact and its manufacture is easy.

Example 10 of the zoom lens of the present invention is shown as follows. It is desirable that the following conditions are satisfied in this example.

$$0.05 < \phi w D e < 0.13 \quad (15)$$

$$-0.20 < \phi_{1a}/\phi_1 < 0.20 \quad (16)$$

$$0.80 < \phi_a/|\phi_2| < 1.30 \quad (17)$$

where $\phi_1$: refractive power of the first lens group $\phi_2$: refractive power of the second lens group ($\phi_2 < 0$)

$\phi w$: refractive power of the entire system at the wide-angle end $\phi_{1a}$: refractive power of the front lens component in the case where the first lens group is divided into the front and rear lens components at a position between the two concave surfaces De: on-axis thickness of the rear lens component Inequality (15) relates to the on-axis thickness of the rear lens component in the case where the first lens group is divided into the front and rear lens components at a position between the two concave surfaces faced to each other. When the on-axis thickness is reduced exceeding the lower limit, the astigmatism is increased. When the on-axis thickness is increased exceeding the upper limit, an eclipse tends to be generated when the diaphragm is reduced in the structure of the present invention in which the principal ray crosses the optical axis in the first lens group. Inequality (16) relates to the refractive power of the front lens component in the first lens group. When the negative refractive power is reduced exceeding the lower limit, the height of a ray from an on-axial object point is increased in the positive rear lens component, so that it becomes difficult to correct the spherical aberration. When the positive refractive power is increased exceeding the upper limit, it becomes difficult to correct the chromatic aberration generated in the first lens group.

Inequality (17) relates to the ratio of refractive power of the first and second lens groups. The amount of the movement of the second lens group in the process of zooming is prescribed.

When the refractive power of the entire system at the telephoto end is $\phi t$, the amount of the movement $\Delta X_2$ of the second lens group is expressed as follows.

$$\Delta X_2 = (\phi_1/|\phi_2|)\{(1/\phi_t) - (1/\phi_w)\} \quad (18)$$

In this case, $\phi_w$ and $\phi_t$ are determined according to the specification of the lens, $\Delta X_2$ is controlled by $\phi_1$ and $|\phi_2|$. When $|\phi_2|$ is increased with respect to $\phi_1$ exceeding the lower limit of inequality (17), the positive distortion generated in the second lens group is increased, and when $|\phi_2|$ exceeds the upper limit, $\Delta X_2$ is increased, so that the lens dimensions are increased.

Figure 19:
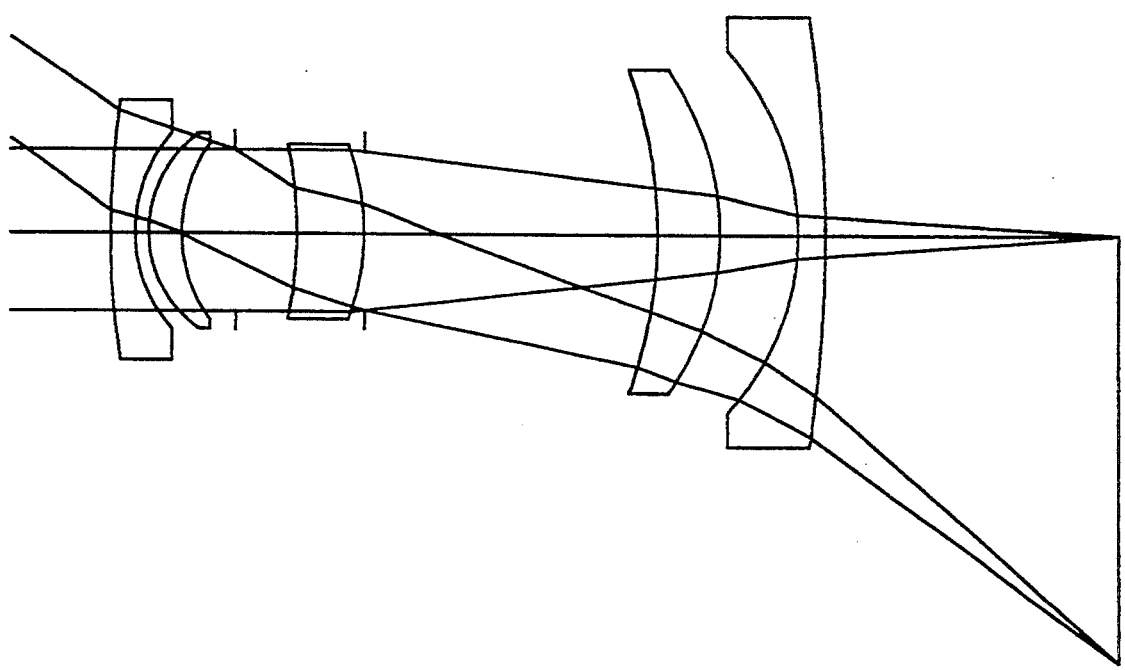
FIG. 19 is a sectional view of Example 10 of the zoom lens of the present invention.
Figure 21:
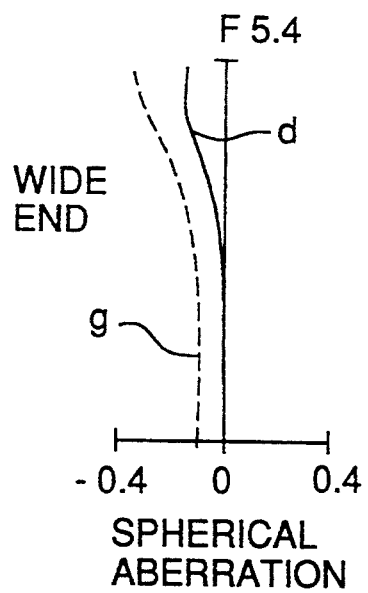
FIGS. 21(a)-(i) are aberration curve diagrams in the case where the object distance is 0.5 m in Examples 8 to 10.
Figure 21:
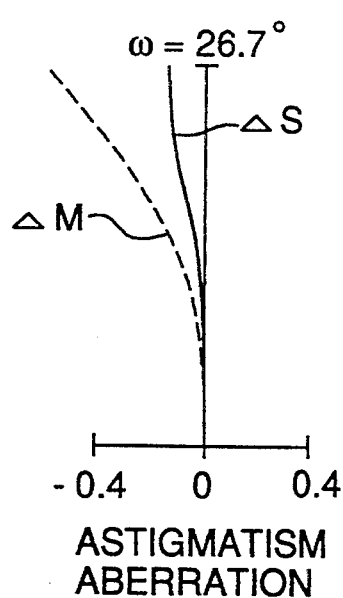
Figure 21:
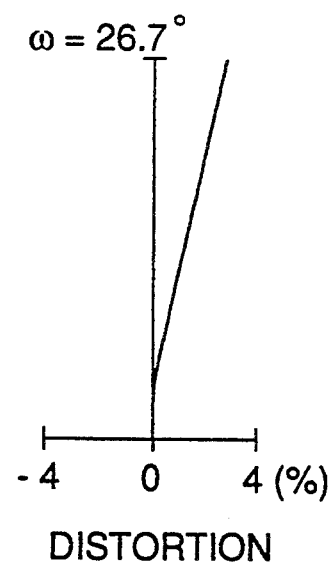
Figure 21:
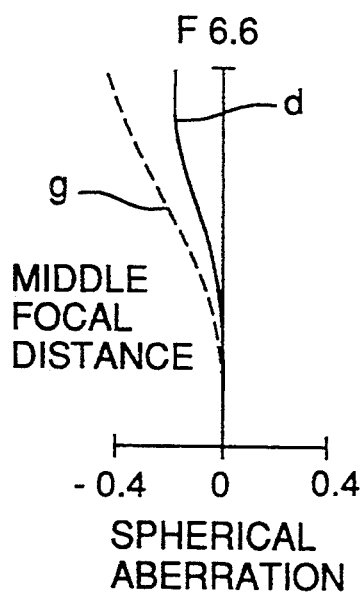
Figure 21:
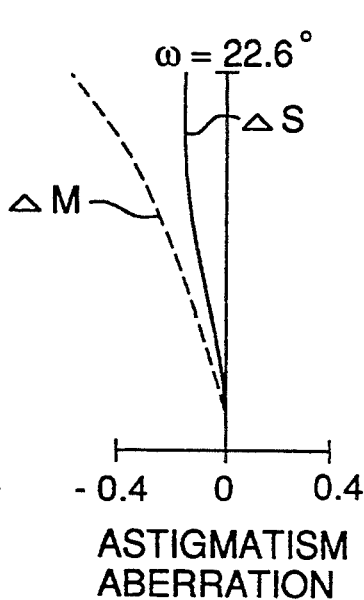
Figure 21:
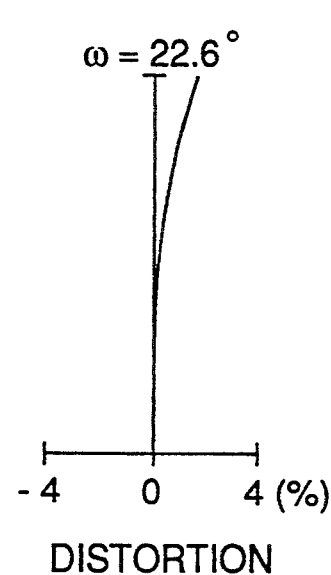
Figure 21:
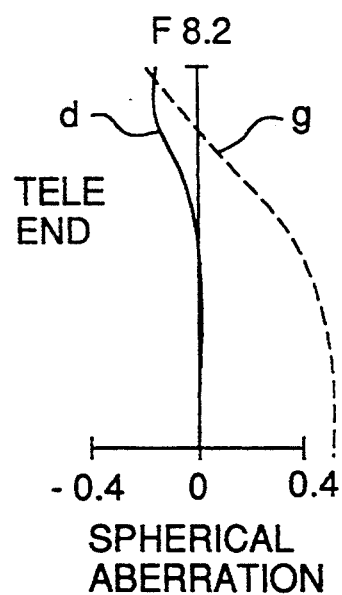
Figure 21:
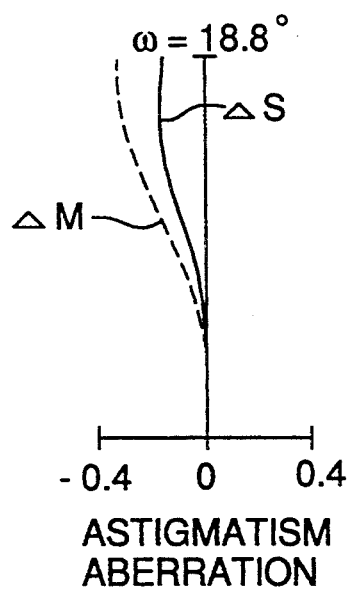
Figure 21:
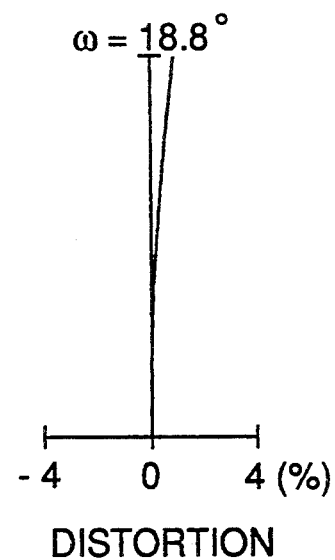

FIG. 19 is a sectional view of the zoom lens of this example. As shown in the drawing, the first lens group includes two pieces of positive meniscus lenses, the concave surfaces of which are faced to each other. When a negative lens is disposed on the object side of this pair of positive lenses, the longitudinal chromatic aberration is corrected. The first and second lenses are provided with an aspherical surface so that the off-axial negative refractive power is increased (in other words, the positive refractive power is weak). In this case, the aspherical surface of the first lens, the height of a principal ray of which is high, corrects the astigmatism generated in the rear component in the first lens group, and also corrects the positive distortion generated in the second lens group. The aspherical surface of the second lens corrects the spherical aberration generated in the rear lens component of the first lens group. The second lens is provided with an aspherical surface so that the off-axial positive refractive power is increased (in other words, the negative refractive power is weak), and the positive distortion is corrected.

In the table, f is a focal distance of the entire lens system, F is an F-number, ω is a half angle of view, R is a paraxial radius of curvature, D is an on-axis interval of surfaces, N is a refractive index with respect to a d-line, and υ is Abbe's number. Mark * represents an aspherical surface. The profile of the aspherical surface can be expressed by the aforementioned Equation 1 wherein the rectangular coordinates are used in which the origin is the vertex of the surface and the X axis is established in the optical axis direction, and wherein the paraxial curvature is c, the conical coefficient is K, and the aspherical coefficient is Ai (i=4, 6, 8).

| f = 39.00–59.03 | F5.4–8.2 | 2ω= 56.5°–39.9° | |
|---|---|---|---|
| Surface No. | R | D | N | υ |
| 1 | 80.141 | 1.50 | 1.58300 | 30.0 |
| 2* | 11.688 | 0.30 | | |
| 3 | 7.638 | 2.00 | 1.49200 | 57.0 |
| 4* | 20.494 | 4.00 | | |
| 5 | −39.636 | 3.45 | 1.79952 | 42.2 |
| 6 | −14.418 | A | | |
| 7 | −72.663 | 3.00 | 1.49200 | 57.0 |
| 8* | −19.439 | 3.68 | | |
| 9 | −12.130 | 1.20 | 1.70154 | 41.2 |
| 10 | −146.620 | | | |

-continued

| f | A |
|---|---|
| 39.00 | 11.64 |
| 47.73 | 7.43 |
| 59.03 | 3.82 |

Aspherical surface coefficient

| Second surface | Fourth surface |
|---|---|
| $K = -0.10509 \times 10$ | $K = 0.12180 \times 10^2$ |
| $A_4 = 0.15149 \times 10^{-4}$ | $A_4 = 0.28025 \times 10^{-3}$ |
| $A_6 = -0.13595 \times 10^{-6}$ | $A_6 = 0.28025 \times 10^{-3}$ |
| $A_8 \mathbin{/\!/} = 0$ | $A_8 = 0$ |
| Eight surface | |
| $K = 0$ | |
| $A_4 = -0.32639 \times 10^{-4}$ | |
| $A_6 = -0.25120 \times 10^{-6}$ | |
| $A_8 = -0.12684 \times 10^{-8}$ | |

$\phi_w De = 0.088$, $\phi_{1a}/\phi_1 = 0.025$, $\phi_1/|\phi_2| = 1.1Q5$

FIGS. 20(a) to 20(i) and FIGS. 21(a) to 21(i) are aberration curves of an example of the zoom lens of the present invention, in the case where the object distance is infinity and 0.5 m. In the diagrams, "d" and "g" respectively show the spherical aberration with respect to d and g lines, and ΔS and ΔM respectively show the sagittal image surface and the meridional image surface. As shown in FIGS. 21(a) to 21(i), the change of performance is slight in a short distance. Especially, it is noteworthy that the change of performance is small at the telephoto end where the magnification is the largest. At this time, the magnification is approximately 1/7. In this case, the object corresponds to B5 size in the case of a 35 mm camera.

In this example, although the F-number is 5.4 at the wide-angle end, a brighter lens can be provided without applying new technology when the number of lenses is increased or an apherical lens of high refractive index is used.

As explained above, according to the present invention, although the lens is made compact and its manufacturing cost is reduced, the aberration of the lens can be excellently corrected, and the change of the performance of the lens is slight in a focusing operation.

What is claimed is:
1. A zoom lens comprising:
   (a) a first lens group having a positive refractive power provided nearest to an object to be photographed, comprising a front lens component having a negative refractive power including at least one aspherical surface and a rear lens component having a positive refractive power, said front lens component comprising a first negative lens and a second meniscus lens, the convex surface of said second meniscus lens being directed to the image side;
   (b) a second lens group having a negative refractive power provided furthest from an object to be photographed; and
   (c) means for varying image magnification of said zoom lens by adjusting the distance between said first and said second lens groups, wherein the following inequality is satisfied:

$\nu n < 35$ where $\nu n$ is the Abbe's number of the lens which has a stronger negative refractive power of the two lenses in the front component of the first lens group.

2. The zoom lens of claim 1 wherein the following inequalities are satisfied:

$0.05 < |\phi_{1a}|/\phi_1 < 0.70$ $0.80 < \phi_1/|\phi_2| < 1.30$ in which $\phi_a$ represents the refractive power ($\phi_{1a} < 0$) of said negative front lens component of said first lens group, $\phi_1$ represents the refractive power of said first lens group and $\phi_2$ represents the refractive power ($\phi_2 < 0$) of said second lens group.

3. A zoom lens comprising:
   (a) a first lens group having a positive refractive power provided nearest to an object to be photographed, consisting of a front lens component having a single lens with relatively weak refractive power including at least one aspherical surface and a rear lens component having a positive refractive power, said first lens group further having a diaphragm provided to a rear side thereof;
   (b) a second lens group having a negative refractive power provided furthest from an object to be photographed; and
   (c) means for varying image magnification of said zoom lens by adjusting the distance between said first and said second lens groups.

4. The zoom lens of claim 3 wherein the following inequalities are satisfied:

$-0.20 < \phi_{1a}/\phi_1 < 0.20$ $0.80 < \phi_1/|\phi_2| < 1.30$ in which $\phi_a$ represents the refractive power of said front lens component of said first lens group, $\phi_1$ represents the refractive power of said first lens group and $\phi_2$ represents the refractive power ($\phi_2 < 0$) of said second lens group.

5. A zoom lens comprising:
   (a) a first lens group having a positive refractive power and provided nearest to an object to be photographed, said first lens group having two lenses each including at least one concave surface, wherein the concave surfaces of the two lenses face each other;
   (b) a diaphragm provided to a rear side of said first lens group:
   (c) a second lens group having a negative refractive power provided furthest from an object to be photographed; and
   (d) means for varying image magnification of said zoom lens by adjusting a distance between said first and second lens groups,
   wherein the following inequality is satisfied:

$0.05 < \phi_w De < 0.13$ wherein $\phi_w$ represents the refractive power of the entire zoom lens at a wide angle end position and De represents the thickness of said rear lens component at the optical axis of said zoom lens.

6. The zoom of claim 5 wherein the following inequalities are satisfied:

$-0.20 < \phi_{1a}/\phi_1 < 0.20$ $0.80 < \phi_1/|\phi_2| < 1.30$ in which $\phi_1$ represents the refractive power of said first lens group, $\phi_2$ represents the refractive power ($\phi_2 < 0$) of said second lens group, and $\phi_{1a}$ represents the refractive power of a front lens component when said first lens group is divided into said front lens component and a rear lens component at a position between said two concave surfaces.

* * * * *

UNITED STATES PATENT AND TRADEMARK OFFICE
CERTIFICATE OF CORRECTION

PATENT NO. : 5,418,647
DATED : May 23, 1995
INVENTOR(S) : Akira ISHISAKA

It is certified that error appears in the above-indentified patent and that said Letters Patent is hereby corrected as shown below:

Claim 1, column 15, line 51, "the" should read --an--.

Claim 2, column 16, line 4, "$\phi a$" should read --$\phi_1 a$--.

Claim 4, column 16, line 29, "$\phi a$" should read --$\phi_1 a$--.

Claim 6, column 16, line 55, after "zoom" insert --lens--.

Signed and Sealed this

Twenty-first Day of May, 1996

Attest:

BRUCE LEHMAN

Attesting Officer    Commissioner of Patents and Trademarks